(12) United States Patent
Holzmueller et al.

(10) Patent No.: US 11,657,927 B2
(45) Date of Patent: May 23, 2023

(54) HIGH TEMPERATURE SUBMERSIBLE POWER CABLE

(71) Applicant: Schlumberger Technology Corporation, Sugar Land, TX (US)

(72) Inventors: Jason Holzmueller, Lawrence, KS (US); Jinglei Xiang, Rancho Cucamonga, CA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 17/808,672

(22) Filed: Jun. 24, 2022

(65) Prior Publication Data
US 2022/0328213 A1     Oct. 13, 2022

Related U.S. Application Data

(62) Division of application No. 15/758,417, filed as application No. PCT/US2016/053241 on Sep. 23, 2016, now Pat. No. 11,398,323.

(Continued)

(51) Int. Cl.
*H01B 3/28*     (2006.01)
*H01B 7/282*    (2006.01)
(Continued)

(52) U.S. Cl.
CPC ............. *H01B 7/2825* (2013.01); *H01B 3/16* (2013.01); *H01B 3/28* (2013.01); *H01B 3/441* (2013.01);
(Continued)

(58) Field of Classification Search
CPC ...................................................... H01B 3/28
See application file for complete search history.

(56) References Cited

U.S. PATENT DOCUMENTS 2,576,227 A    11/1951    Hutchins, Jr.
4,066,590 A     1/1978    Eldred et al.
(Continued)

FOREIGN PATENT DOCUMENTS

CA    2774766 A1 *   3/2011
EP    0708455 A1      4/1996
(Continued)

OTHER PUBLICATIONS

Vistalon 1703P EPDM for a new generation of medium cable insulation, ExxonMobil chemical, Jul. 2, 2003.
(Continued)

*Primary Examiner* — Jeffry H Aftergut
(74) *Attorney, Agent, or Firm* — Matthew Goode

(57) ABSTRACT

A method can include extruding an electrically insulating elastomeric compound about a conductor where the electrically insulating elastomeric compound includes ethylene propylene diene monomer (M-class) rubber (EPDM) and an alkane-based peroxide that generates radicals that form decomposition products; cross-linking the EPDM via radical polymerization to form an electrically insulating layer about the conductor; heating the cross-linked EPDM to at least 55 degrees C. to reduce the concentration of the decomposition products in the electrically insulating layer; and disposing a gas barrier layer about the electrically insulating layer.

20 Claims, 21 Drawing Sheets

Related U.S. Application Data

(60) Provisional application No. 62/235,183, filed on Sep. 30, 2015.

(51) Int. Cl.
*H01B 7/04* (2006.01)
*H01B 3/44* (2006.01)
*H01B 3/16* (2006.01)
*H01B 13/14* (2006.01)
*H01B 7/18* (2006.01)
*H01B 7/28* (2006.01)

(52) U.S. Cl.
CPC .............. *H01B 7/046* (2013.01); *H01B 7/18* (2013.01); *H01B 7/282* (2013.01); *H01B 7/2806* (2013.01); *H01B 13/14* (2013.01); *H01B 13/141* (2013.01); *Y02A 30/14* (2018.01)

(56) References Cited

U.S. PATENT DOCUMENTS

| | | | |
|---|---|---|---|
| 4,554,173 | A | 11/1985 | Fujimura et al. |
| 4,910,241 | A | 3/1990 | Abolins et al. |
| 5,080,942 | A | 1/1992 | Yau |
| 6,566,420 | B1 | 5/2003 | Guillot et al. |
| 2006/0199910 | A1 | 9/2006 | Walton et al. |
| 2010/0096161 | A1 | 4/2010 | Dalrymple et al. |
| 2010/0193217 | A1 | 8/2010 | Laurenson et al. |
| 2011/0209895 | A1 | 9/2011 | Saito et al. |
| 2013/0306348 | A1* | 11/2013 | Holzmueller .......... H01B 7/046 174/105 R |
| 2015/0159069 | A1 | 6/2015 | Ranganathan et al. |
| 2015/0376369 | A1 | 12/2015 | Ranganathan et al. |
| 2018/0247737 | A1 | 8/2018 | Holzmueller et al. |

FOREIGN PATENT DOCUMENTS

| | | |
|---|---|---|
| JP | 2010123361 A | 6/2010 |
| WO | WO-2005/031761 A1 * | 4/2005 |
| WO | 2005123828 A1 | 12/2005 |
| WO | 2015034974 A1 | 3/2015 |
| WO | 2015059520 A1 | 4/2015 |

OTHER PUBLICATIONS

International Search Report and Written Opinion issued in the PCT application PCT/US2016/053241, dated Jan. 10, 2017 (13 pages).
International Preliminary Report on Patentability issued in the PCT application PCT/US2016/053241, dated Apr. 3, 2018 (9 pages).
Office Action issued in the BR application 112018006668-0, dated Aug. 17, 2020 (8 pages).

* cited by examiner

HIGH TEMPERATURE SUBMERSIBLE POWER CABLE

RELATED APPLICATIONS

This application is a divisional application of U.S. application Ser. No. 15/758,417, filed Mar. 8, 2018, which is a National Stage of International Application No. PCT/US2016/053241, filed Sep. 23, 2016, which claims priority to and the benefit of a U.S. provisional application Ser. No. 62/235,183, filed 30 Sep. 2015, each of which is incorporated by reference herein.

BACKGROUND

Equipment used in the oil and gas industry may be exposed to high-temperature and/or high-pressure environments. Such environments may also be chemically harsh, for example, consider environments that may include chemicals such as hydrogen sulfide, carbon dioxide, etc. Such environments can include one or more types of fluids where, for example, equipment may be at least partially submersed in the one or more types of fluids. Various types of environmental conditions can damage equipment.

SUMMARY

A method can include extruding an electrically insulating elastomeric compound about a conductor where the electrically insulating elastomeric compound includes ethylene propylene diene monomer (M-class) rubber (EPDM) and an alkane-based peroxide that generates radicals that form decomposition products; cross-linking the EPDM via radical polymerization to form an electrically insulating layer about the conductor; heating the cross-linked EPDM to at least 55 degrees C. to reduce the concentration of the decomposition products in the electrically insulating layer; and disposing a gas barrier layer about the electrically insulating layer. A submersible power cable can include a conductor; an insulation layer disposed about the conductor where the insulation layer includes ethylene propylene diene monomer (M-class) rubber (EPDM) and where the insulation layer includes less than 3 percent by weight of hexane extractable peroxide decomposition products; and a gas barrier layer disposed about the insulation layer. An electric submersible pump power cable can include a conductor; an insulation layer disposed about the conductor where the insulation layer includes ethylene propylene diene monomer (M-class) rubber (EPDM) and where the insulation layer includes less than 3 percent by weight of hexane extractable peroxide decomposition products; a gas barrier layer disposed about the insulation layer; and an armor layer disposed about the gas barrier layer. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
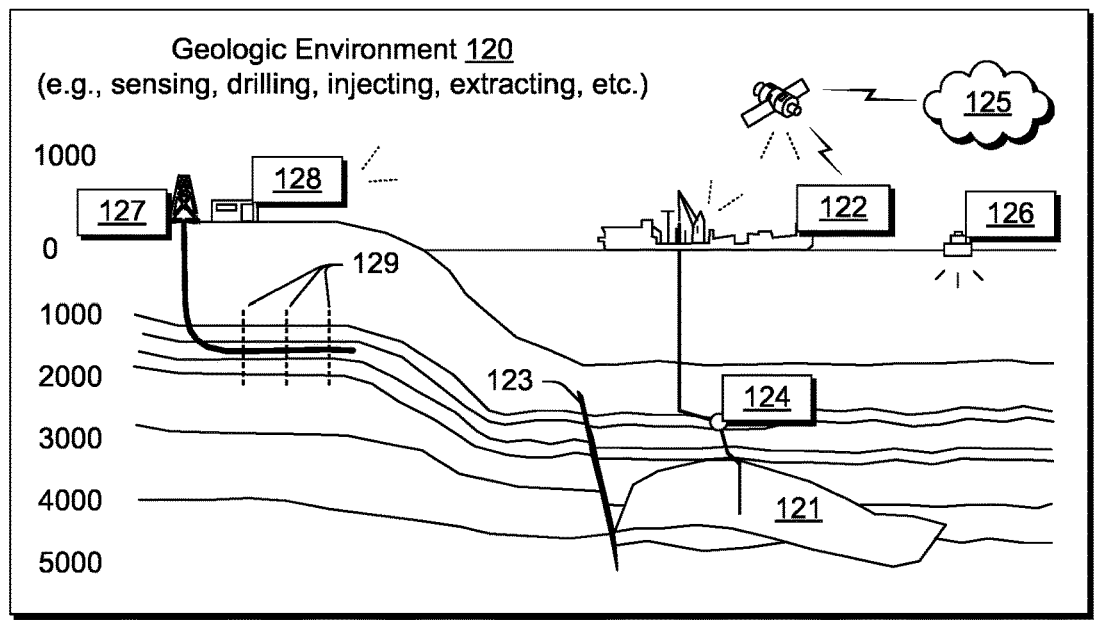
FIG. 1 illustrates examples of equipment in geologic environments.
Figure 1:
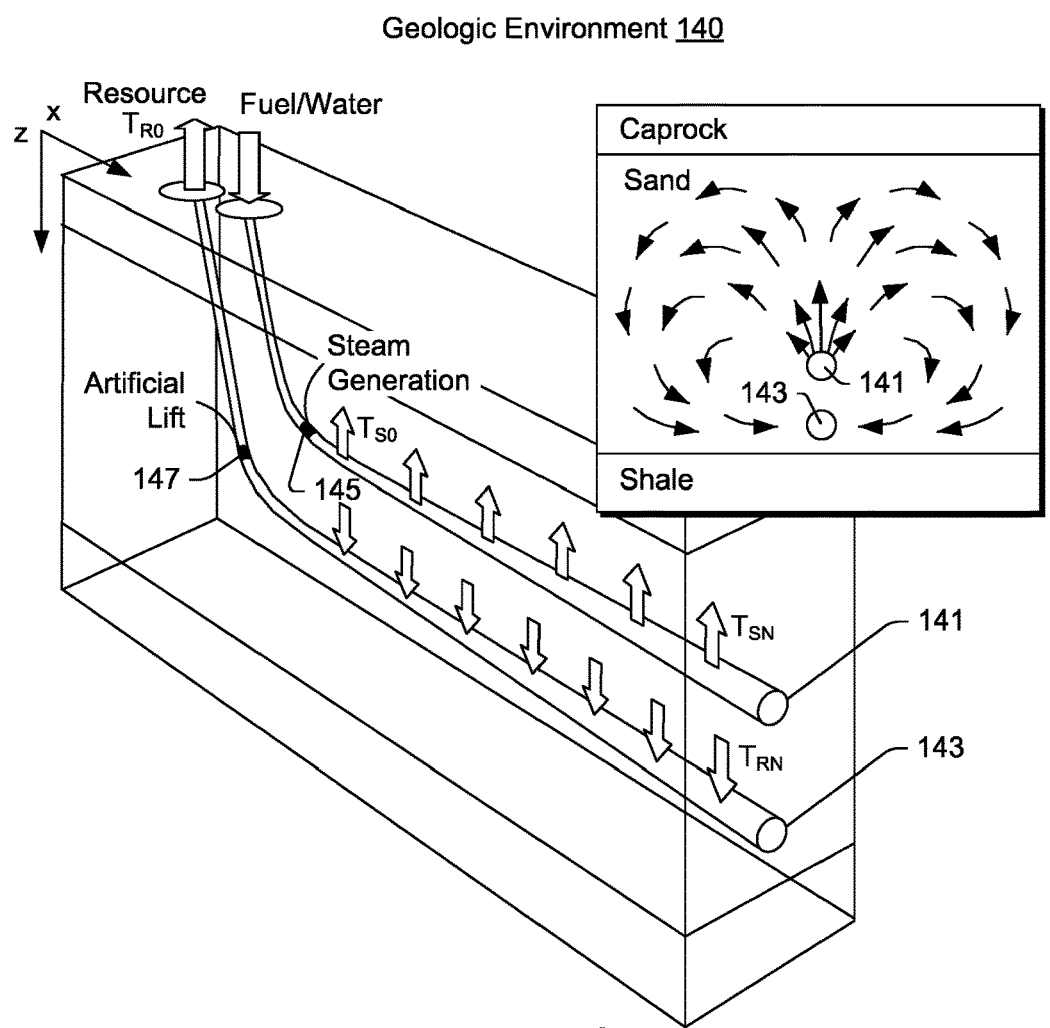

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

In various types of wells, well operations, etc., an electric submersible pump (ESP) power cables and motor lead extensions (MLEs) may be exposed to high temperatures and/or high concentration of corrosive and sour gases and fluids. To protect one or more electrically insulated copper conductors, metallic lead (Pb) sheaths can be employed as a barrier layer to block permeation of downhole media. Such a barrier layer may be referred to as a gas barrier layer, as it is intended to be relatively impermeable to gas.

As an example, a power cable for a downhole application may include an extruded continuous metallic lead (Pb) barrier layer that aims to protect materials interiorly disposed thereto from downhole media such as, for example, one or more corrosive gases (e.g., consider $CO_2$ and $H_2S$). Such an extruded lead (Pb) barrier layer tends to be quite effective at inhibiting gas permeation. As an example, a minimum manufacturing wall thickness of the metallic lead (Pb) barrier layer can be specified (e.g., from about 20 mils to about 60 mils or about 0.5 mm to about 1.5 mm) that aims to help ensure effective protection from corrosive gases.

As an example, a cable may include one or more lead (Pb) alloy layers (e.g., including at least lead (Pb) and tin (Sn)) that may act as a barrier or barriers to gas. In such an example, the one or more lead (Pb) alloy layers may be part of a tape or tapes. As an example, a tape can include one or more lead (Pb) alloy layers and adhesive. As an example, a tape may include one or more lead (Pb) alloy layers that may be of a thickness that is less than that of a metallic lead (Pb) barrier layer of a cable (e.g., a comparable cable). Such an approach may reduce cable weight, for example, when compared to cable weight for a cable that includes one or more metallic lead (Pb) layers as gas barrier layer or layers.

While one or more gas barrier layers may aim to be impermeable to gas migration from an exterior region to an interior region, damage may occur to a cable where pressure can build in an interior region that is interior to a gas barrier layer. For example, if one or more decomposition products and/or degradation products within an insulation layer build up in an interior region, a gas barrier layer can rupture. For example, a lead (Pb) based barrier layer (e.g., extruded lead, alloy tape, etc.) may rupture where a peroxide or peroxide associated with radical polymerization generates decomposition products that remain within an insulation layer at the time the lead (Pb) based barrier layer is applied about the insulation layer (e.g., directly or indirectly). Where gas pressure builds in an interior region, that gas pressure can apply force to a gas barrier layer because the gas barrier layer is substantially impermeable to gas. Such force can weaken the gas barrier layer and cause it to rupture. Upon rupture of the gas barrier layer, while gas can flow outwardly, gas can also then flow inwardly to insulation where damage may occur to insulation and/or conductor(s). When a gas barrier layer is ruptured, fluid, whether liquid or gas, may flow inwardly and cause damage or otherwise disrupt function(s) of a power cable.

As an example, a cable that includes an electrical conductor can include insulation that electrically insulates at least a portion of the electrical conductor, for example, along a length of the electrical conductor, which may be in the form of a wire (e.g., solid, stranded, etc.), and can include a gas barrier layer disposed about the insulation layer (e.g., directly or indirectly).

As an example, insulation can include a polymeric material such as, for example, ethylene propylene diene monomer (M-class) rubber (EPDM) as a type of synthetic rubber that is an elastomer where The E refers to ethylene, P to propylene, D to diene and M refers to a classification in ASTM standard D-1418 (e.g., ethylene copolymerized with propylene and a diene or ethylene propylene diene monomer (M-class) rubber). EPDM can be a byproduct of petroleum where EPDM and petroleum are largely composed of non-polar molecules such that they are miscible (e.g., oil may permeate into EPDM and cause it to swell). As such, where well fluid contacts an EPDM insulation layer, damage may occur to the insulation due to swelling of the EPDM (e.g., which may apply pressure that can mechanically damage one or more features of a cable).

Insulation can be formulated as a mixture that may be referred to as a compound. Where EPDM is included as a predominant polymeric material for insulation (e.g., a base polymer), a compound may be referred to as an EPDM compound and a resulting insulation layer may be referred to as an EPDM insulation layer.

As an example, an insulation compound can include a base polymer, one or more fillers, one or more metal oxides, one or more antioxidants, one or more plasticizers, one or more process aids, one or more curatives and one or more other types of materials.

As an example, an insulation compound can include EPDM and one or more alkane-based peroxides. A peroxide is a molecule that is a compound that includes an oxygen-oxygen single bond and/or a peroxide anion. An example of a peroxide is 2,5-dimethyl-2,5-di(t-butylperoxy)hexane, which is referred to as DBPH. In such an example, an insulation compound can include EPDM and, for example, the alkane-based peroxide 2,5-dimethyl-2,5-di(t-butylperoxy)hexane as a curative (e.g., to cure EPDM as a base polymer). As an example, a curative may be mixed in a compound at a concentration in a range of about 1 part per hundred of base polymer to about 10 parts per hundred of base polymer (e.g., about 1 phr to about 10 phr).

In various embodiments, one or more alkane-based peroxides are utilized in an insulation compound to generate radicals where such radicals can decompose into decomposition products. As an example, a method of manufacturing a cable can include heating electrical insulation to reduce the concentration of decomposition products in the electrical insulation prior to forming a barrier layer about the electrical insulation. In such an example, the decomposition products can be those formed from an alkane-based peroxide where the maximum molecular weight of the peroxide decomposition products is less than about 100. For example, for DBPH, acetone may be the highest molecular weight composition product, with a molecular weight less than about 60. As such, a peroxide decomposition product includes at least one carbon atom that is present in the peroxide (e.g., acetone as a peroxide decomposition product includes three carbon atoms that correspond to three carbon atoms of the peroxide prior to decomposition). Decomposition products may include one or more other types of products, which may stem from material that does not include carbon atoms of a peroxide curative. Reduction of decomposition products prior to forming a gas barrier layer about electrical insulation can increase a temperature rating of a cable and help to protect the integrity of the gas barrier layer, for example, from "inside-out" mechanisms that can cause damage.

As an example, a polymeric insulation compound (e.g., a mixture of chemicals) may be formulated, cured to cause cross-linking and heated to promote release of non-cross-linked molecules and/or compounds to form an insulation layer in a manner that can minimize hexane extractable decomposition products. In such an example, a method can include minimizing the presence of nonvolatile peroxide decomposition byproducts via use of an alkane-based peroxide or alkane-based peroxides. For example, an alkane-based peroxide can decompose into peroxide decomposition products that do not include one or more aromatics and that are of a maximum molecular weight less than about 100 or, for example, less than about 78.11, which is the molecular weight of beneze ($C_6H_6$), which is an aromatic hydrocarbon or arene (e.g., a molecule with a ring or cyclical structure).

As an example, a method can include achieving a desired amount of uncross-linked base polymer, which can be a relatively low amount of uncross-linked base polymer, which correspondingly can provide for a relatively high amount of cross-linked base polymer. As an example, a method can include minimizing uncross-linked base polymer via use of an EPDM grade with active pendant dienes along with an active peroxide to generate a relatively high cross-link density. Dienes that can be used in the manufacture of EPDM include dicyclopentadiene (DCPD), ethylidene norbornene (ENB), and vinyl norbornene (VNB). As an example, an EPDM grade may be selected with ENB and/or VNB as active pendent dienes.

As an example, a cure co-agent (e.g., cure state promotor) can be included in a polymeric insulation compound to increase cross-linking. As an example, a high vinyl polybutadiene co-agent may be utilized. As an example, a co-agent can be a Type II co-agent that provides desirable cross-link densities. For example, co-agents can be classified based on their contributions to cure and divided into Type I and Type II. Type II co-agents can contribute to the state of cure (e.g., via promotion of cross-linking via addition reactions through one or more pendant groups).

As an example, a method can include maintaining processability of a polymeric insulation compound via use of a relatively low molecular weight, broad MWD base polymer and cross-linkable process aid(s). Such an approach can help to reduce use of plasticizer oils (e.g., optionally relatively free of plasticizer oil). For example, a low molecular weight plasticizer can be utilized that includes groups that cross-link to a base polymer. In such an example, a polymeric insulation compound can be free of plasticizer oil. As such, "free" products as associated with plasticizer may be reduced in insulation that is interior to a gas barrier layer.

While various types of lead (Pb) based gas barrier layers are mentioned, one or more other types of gas barrier layers may be utilized that aim to be relatively impermeable to gas such as, for example, $H_2S$ and $CO_2$. As an example, an HNBR type of gas barrier layer may be utilized.

As an example, a cable may be utilized as a power cable and deployment cable for a tool. For example, consider a cable that can be utilized to power and to deploy an electric submersible pump (ESP) in a bore in a geologic environment.

FIG. 1 shows examples of geologic environments 120 and 140. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with one or more of a variety of sensors, detectors, actuators, etc. For example, equipment 122 may include communication circuitry to receive and to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, etc.

As to the geologic environment 140, as shown in FIG. 1, it includes two wells 141 and 143 (e.g., bores), which may be, for example, disposed at least partially in a layer such as a sand layer disposed between caprock and shale. As an example, the geologic environment 140 may be outfitted with equipment 145, which may be, for example, steam assisted gravity drainage (SAGD) equipment for injecting steam for enhancing extraction of a resource from a reservoir. SAGD is a technique that involves subterranean delivery of steam to enhance flow of heavy oil, bitumen, etc. SAGD can be applied for Enhanced Oil Recovery (EOR), which is also known as tertiary recovery because it changes properties of oil in situ.

As an example, a SAGD operation in the geologic environment 140 may use the well 141 for steam-injection and the well 143 for resource production. In such an example, the equipment 145 may be a downhole steam generator and the equipment 147 may be an electric submersible pump (e.g., an ESP). As an example, one or more electrical cables may be connected to the equipment 145 and one or more electrical cables may be connected to the equipment 147. For example, as to the equipment 145, a cable may provide power to a heater to generate steam, to a pump to pump water (e.g., for steam generation), to a pump to pump fuel (e.g., to burn to generate steam), etc. As to the equipment 147, for example, a cable may provide power to power a motor, power a sensor (e.g., a gauge), etc.

As illustrated in a cross-sectional view of FIG. 1, steam injected via the well 141 may rise in a subterranean portion of the geologic environment and transfer heat to a desirable resource such as heavy oil. In turn, as the resource is heated, its viscosity decreases, allowing it to flow more readily to the well 143 (e.g., a resource production well). In such an example, equipment 147 may then assist with lifting the resource in the well 143 to, for example, a surface facility (e.g., via a wellhead, etc.).

As to a downhole steam generator, as an example, it may be fed by three separate streams of natural gas, air and water (e.g., via conduits) where a gas-air mixture is combined first to create a flame and then the water is injected downstream to create steam. In such an example, the water can also serve to cool a burner wall or walls (e.g., by flowing in a passageway or passageways within a wall). As an example, a SAGD operation may result in condensed steam accompanying a resource (e.g., heavy oil) to a well. In such an example, where a production well includes artificial lift equipment such as an ESP, operation of such equipment may be impacted by the presence of condensed steam (e.g., water). Further, as an example, condensed steam may place demands on separation processing where it is desirable to separate one or more components from a hydrocarbon and water mixture.

Each of the geologic environments 120 and 140 of FIG. 1 may include harsh environments therein. For example, a harsh environment may be classified as being a high-pressure and high-temperature environment. A so-called HPHT environment may include pressures up to about 138 MPa (e.g., about 20,000 psi) and temperatures up to about 205 degrees C. (e.g., about 400 degrees F.), a so-called ultra-HPHT environment may include pressures up to about 241 MPa (e.g., about 35,000 psi) and temperatures up to about 260 degrees C. (e.g., about 500 degrees F.) and a so-called HPHT-hc environment may include pressures greater than about 241 MPa (e.g., about 35,000 psi) and temperatures greater than about 260 degrees C. (e.g., about 500 degrees F.). As an example, an environment may be classified based in one of the aforementioned classes based on pressure or temperature alone. As an example, an environment may have its pressure and/or temperature elevated, for example, through use of equipment, techniques, etc. For example, a SAGD operation may elevate temperature of an environment (e.g., by 100 degrees C. or more).

As an example, an environment may be classified based at least in part on its chemical composition. For example, where an environment includes hydrogen sulfide ($H_2S$), carbon dioxide ($CO_2$), etc., the environment may be corrosive to certain materials. As an example, an environment may be classified based at least in part on particulate matter that may be in a fluid (e.g., suspended, entrained, etc.). As an example, particulate matter in an environment may be abrasive or otherwise damaging to equipment. As an example, matter may be soluble or insoluble in an environment and, for example, soluble in one environment and substantially insoluble in another.

Conditions in a geologic environment may be transient and/or persistent. Where equipment is placed within a geologic environment, longevity of the equipment can depend on characteristics of the environment and, for example, duration of use of the equipment as well as function of the equipment. For example, a high-voltage power cable may itself pose challenges regardless of the environment into which it is placed. Where equipment is to endure in an environment over a substantial period of time, uncertainty may arise in one or more factors that could impact integrity or expected lifetime of the equipment. As an example, where a period of time may be of the order of decades, equipment that is intended to last for such a period of time can be constructed with materials that can endure environmental conditions imposed thereon, whether imposed by an environment or environments and/or one or more functions of the equipment itself.

Figure 2:
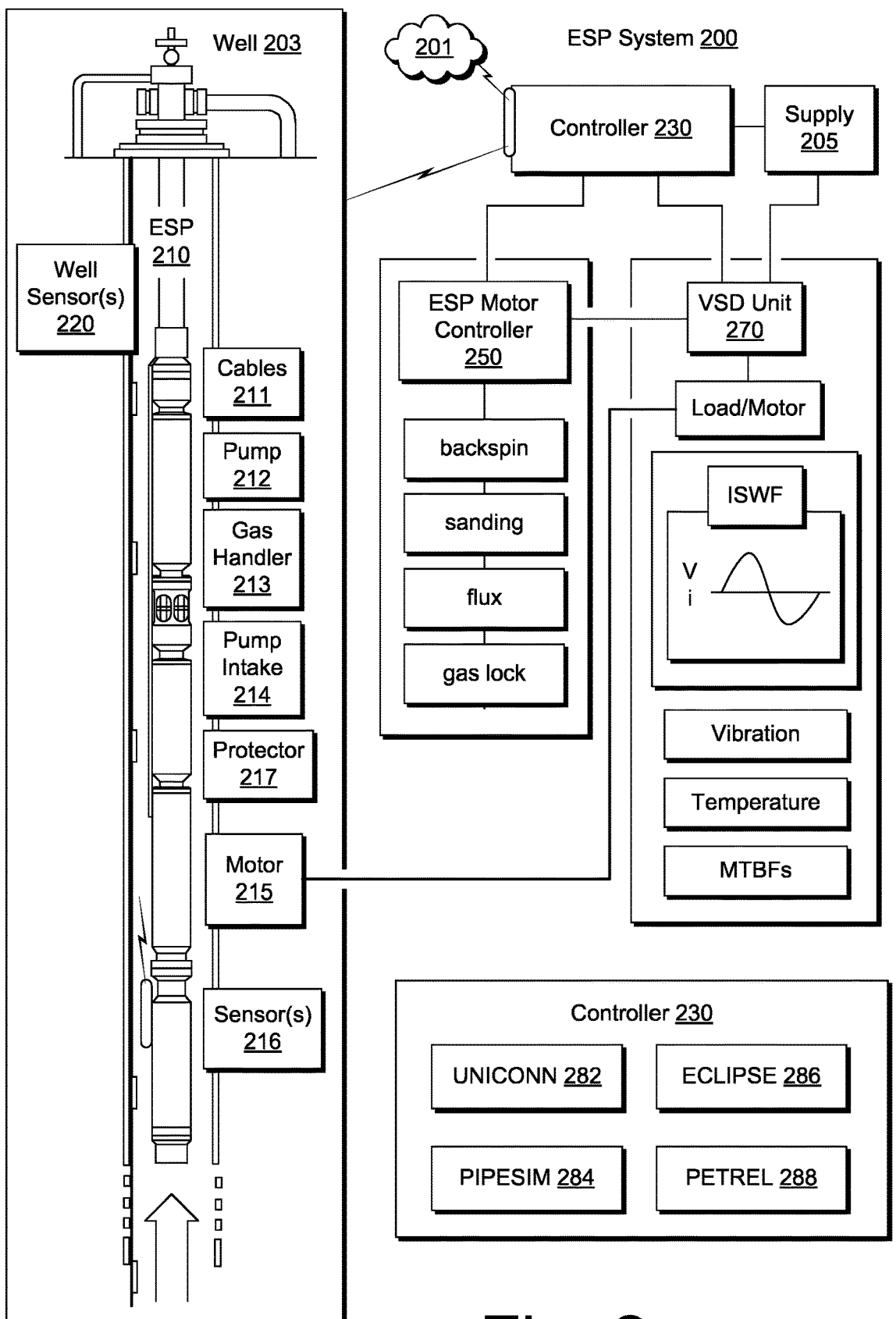
FIG. 2 illustrates an example of an electric submersible pump system.

FIG. 2 shows an example of an ESP system 200 that includes an ESP 210 as an example of equipment that may be placed in a geologic environment. As an example, an ESP may be expected to function in an environment over an extended period of time (e.g., optionally of the order of years). As an example, a commercially available ESP (such as one of the REDA™ ESPs marketed by Schlumberger Limited, Houston, Tex.) may be employed to pump fluid(s).

In the example of FIG. 2, the ESP system 200 includes a network 201, a well 203 disposed in a geologic environment, a power supply 205, the ESP 210, a controller 230, a motor controller 250 and a variable speed drive (VSD) unit 270. The power supply 205 may receive power from a power grid, an onsite generator (e.g., natural gas driven turbine), or other source. The power supply 205 may supply a voltage, for example, of about 4.16 kV or more.

As shown, the well 203 includes a wellhead that can include a choke (e.g., a choke valve). For example, the well 203 can include a choke valve to control various operations such as to reduce pressure of a fluid from high pressure in a closed wellbore to atmospheric pressure. Adjustable choke valves can include valves constructed to resist wear due to high-velocity, solids-laden fluid flowing by restricting or sealing elements. A wellhead may include one or more sensors such as a temperature sensor, a pressure sensor, a solids sensor, etc.

As to the ESP 210, it is shown as including cables 211 (e.g., or a cable), a pump 212, gas handling features 213, a pump intake 214, a motor 215, one or more sensors 216 (e.g., temperature, pressure, current leakage, vibration, etc.) and optionally a protector 217. The well 203 may include one or more well sensors 220. As an example, a fiber-optic based sensor or other type of sensor may provide for real time sensing of temperature, for example, in SAGD or other operations. As shown in the example of FIG. 1, a well can include a relatively horizontal portion. Such a portion may collect heated heavy oil responsive to steam injection. Measurements of temperature along the length of the well can provide for feedback, for example, to understand conditions downhole of an ESP. Well sensors may extend into a well and beyond a position of an ESP.

In the example of FIG. 2, the controller 230 can include one or more interfaces, for example, for receipt, transmission or receipt and transmission of information with the motor controller 250, the VSD unit 270, the power supply 205 (e.g., a gas fueled turbine generator, a power company, etc.), the network 201, equipment in the well 203, equipment in another well, etc.

As shown in FIG. 2, the controller 230 can include or provide access to one or more modules or frameworks. Further, the controller 230 may include features of a motor controller and optionally supplant the motor controller 250. For example, the controller 230 may include the UNICONN™ motor controller 282 marketed by Schlumberger Limited (Houston, Tex.). In the example of FIG. 2, the controller 230 may access one or more of the PIPESIM™ framework 284, the ECLIPSE™ framework 286 marketed by Schlumberger Limited (Houston, Tex.) and the PETREL™ framework 288 marketed by Schlumberger Limited (Houston, Tex.) (e.g., and optionally the OCEAN™ framework marketed by Schlumberger Limited (Houston, Tex.)).

In the example of FIG. 2, the motor controller 250 may be a commercially available motor controller such as the UNICONN™ motor controller. As an example, the UNICONN™ motor controller can perform some control and data acquisition tasks for ESPs, surface pumps or other monitored wells. For example, the UNICONN™ motor controller can interface with the PHOENIX™ monitoring system, for example, to access pressure, temperature and vibration data and various protection parameters as well as to provide direct current power to downhole sensors. The UNICONN™ motor controller can interface with fixed speed drive (FSD) controllers or a VSD unit, for example, such as the VSD unit 270.

For FSD controllers, the UNICONN™ motor controller can monitor ESP system three-phase currents, three-phase surface voltage, supply voltage and frequency, ESP spinning frequency and leg ground, power factor and motor load.

For VSD units, the UNICONN™ motor controller can monitor VSD output current, ESP running current, VSD output voltage, supply voltage, VSD input and VSD output power, VSD output frequency, drive loading, motor load, three-phase ESP running current, three-phase VSD input or output voltage, ESP spinning frequency, and leg-ground.

The UNICONN™ motor controller can include control functionality for VSD units such as target speed, minimum and maximum speed and base speed (voltage divided by frequency); three jump frequencies and bandwidths; volts per hertz pattern and start-up boost; ability to start an ESP while the motor is spinning; acceleration and deceleration rates, including start to minimum speed and minimum to target speed to maintain constant pressure/load (e.g., from about 0.01 Hz/10,000 s to about 1 Hz/s); stop mode with PWM carrier frequency; base speed voltage selection; rocking start frequency, cycle and pattern control; stall protection with automatic speed reduction; changing motor rotation direction without stopping; speed force; speed follower mode; frequency control to maintain constant speed, pressure or load; current unbalance; voltage unbalance; overvoltage and undervoltage; ESP backspin; and leg-ground.

In the example of FIG. 2, the motor controller 250 includes various modules to handle, for example, backspin of an ESP, sanding of an ESP, flux of an ESP and gas lock of an ESP. As an example, the motor controller 250 may include one or more of such features, other features, etc.

In the example of FIG. 2, the VSD unit 270 may be a low voltage drive (LVD) unit, a medium voltage drive (MVD) unit or other type of unit (e.g., a high voltage drive, which may provide a voltage in excess of about 4.16 kV). For a LVD, a VSD unit can include a step-up transformer, control circuitry and a step-up transformer while, for a MVD, a VSD unit can include an integrated transformer and control circuitry. As an example, the VSD unit 270 may receive power with a voltage of about 4.16 kV and control a motor as a load with a voltage from about 0 V to about 4.16 kV.

As an example, an ESP cable may be rated at, for example, about 3 kV, about 4 kV, or about 5 kV (e.g., or more) and may have a form factor that is flat or round. As an example, for various subsea operations, an ESP cable may be rated at about 6 kV. As an example, a round form factor cable may be used in an application where there is sufficient room in a bore. A round form factor cable may also allow for cancelling electromagnetic interference and promoting evenness of phases to phase voltage distribution. As an example, a flat form factor cable may be used in low clearance applications within a bore or, for example, in shorter run lengths where an increase in temperature of a center conductor is not an appreciable concern during operation.

The VSD unit 270 may include commercially available control circuitry such as the SPEEDSTAR™ MVD control circuitry marketed by Schlumberger Limited (Houston, Tex.). The SPEEDSTAR™ MVD control circuitry is suitable for indoor or outdoor use and comes standard with a visible fused disconnect switch, precharge circuitry, and sine wave output filter (e.g., integral sine wave filter, ISWF) tailored for control and protection of high-horsepower ESPs. The SPEEDSTAR™ MVD control circuitry can include a plug-and-play sine wave output filter, a multilevel PWM inverter output, a 0.95 power factor, programmable load reduction (e.g., soft-stall function), speed control circuitry to maintain constant load or pressure, rocking start (e.g., for stuck pumps resulting from scale, sand, etc.), a utility power receptacle, an acquisition system for the PHOENIX™ monitoring system, a site communication box to support surveillance and control service, a speed control potentiometer. The SPEEDSTAR™ MVD control circuitry can optionally interface with the UNICONN™ motor controller, which may provide some of the foregoing functionality.

In the example of FIG. 2, the VSD unit 270 is shown along with a plot of a sine wave (e.g., achieved via a sine wave filter that includes a capacitor and a reactor), responsiveness to vibration, responsiveness to temperature and as being managed to reduce mean time between failures (MTBFs). The VSD unit 270 may be rated with an ESP to provide for about 40,000 hours (5 years) of operation (e.g., depending on environment, load, etc.). The VSD unit 270 may include surge and lightening protection (e.g., one protection circuit per phase). As to leg-ground monitoring or water intrusion monitoring, such types of monitoring may indicate whether corrosion is or has occurred. Further monitoring of power quality from a supply, to a motor, at a motor, may occur by one or more circuits or features of a controller.

While the example of FIG. 2 shows an ESP that may include centrifugal pump stages, another type of ESP may be controlled. For example, an ESP may include a hydraulic diaphragm electric submersible pump (HDESP), which is a positive-displacement, double-acting diaphragm pump with a downhole motor. HDESPs find use in low-liquid-rate coalbed methane and other oil and gas shallow wells that benefit from artificial lift to remove water from the wellbore. HDESPs may handle a wide variety of fluids and, for example, up to about 2% sand, coal, fines and $H_2S/CO_2$.

As an example, an ESP may include a REDA™ HOTLINE™ high-temperature ESP motor. Such a motor may be suitable for implementation in various types of environments. As an example, a REDA™ HOTLINE™ high-temperature ESP motor may be implemented in a thermal recovery heavy oil production system, such as, for example, SAGD system or other steam-flooding system.

As an example, an ESP motor can include a three-phase squirrel cage with two-pole induction. As an example, an ESP motor may include steel stator laminations that can help focus magnetic forces on rotors, for example, to help reduce energy loss. As an example, stator windings can include copper and insulation. As an example, a motor may be a multiphase motor. As an example, a motor may include windings, etc., for three or more phases.

For connection to a power cable or motor lead extensions (MLEs), a motor may include a pothead. Such a pothead may, for example, provide for a tape-in connection with metal-to-metal seals and/or metal-to-elastomer seals (e.g., to provide a barrier against fluid entry). A motor may include one or more types of potheads or connection mechanisms. As an example, a pothead unit may be provided as a separate unit configured for connection, directly or indirectly, to a motor housing.

As an example, a motor may include dielectric oil (e.g., or dielectric oils), for example, that may help lubricate one or more bearings that support a shaft rotatable by the motor. A motor may be configured to include an oil reservoir, for example, in a base portion of a motor housing, which may allow oil to expand and contract with wide thermal cycles. As an example, a motor may include an oil filter to filter debris.

As an example, a motor housing can house stacked laminations with electrical windings extending through slots in the stacked laminations. The electrical windings may be formed from magnet wire that includes an electrical conductor and at least one polymeric dielectric insulator surrounding the electrical conductor. As an example, a polymeric insulation layer may include a single layer or multiple layers of dielectric tape that may be helically wrapped around an electrical conductor and that may be bonded to the electrical conductor (e.g., and to itself) through use of an adhesive. As an example, a motor housing may include slot liners. For example, consider a material that can be positioned between windings and laminations.

Figure 3:
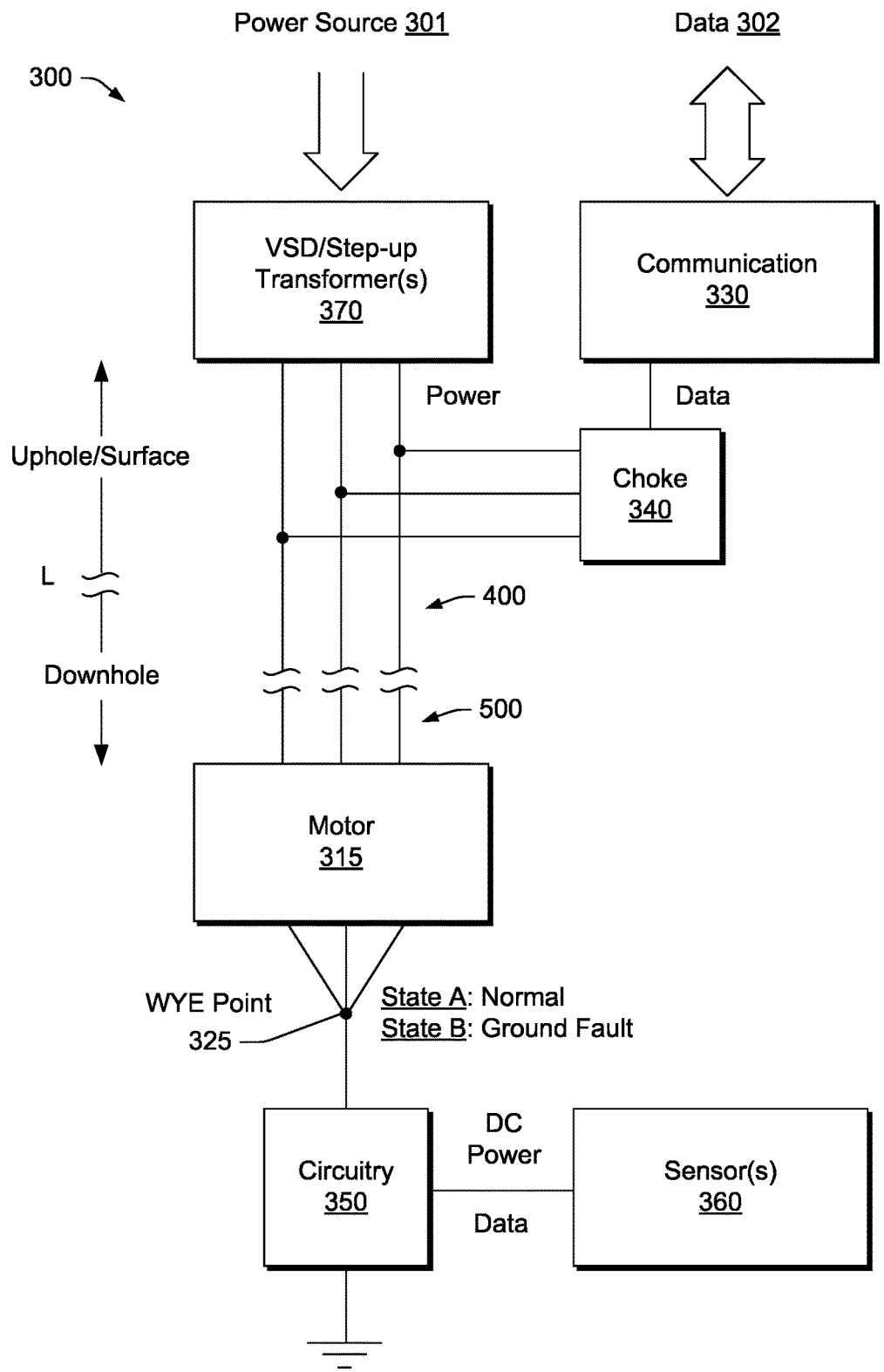
FIG. 3 illustrates examples of equipment.

FIG. 3 shows a block diagram of an example of a system 300 that includes a power cable 400 and MLEs 500. As shown, the system 300 includes a power source 301 as well as data 302. In the example of FIG. 3, the power source 301 can provide power to a VSD/step-up transformer block 370 while the data 302 may be provided to a communication block 330. The data 302 may include instructions, for example, to instruct circuitry of the circuitry block 350, one or more sensors of the sensor block 360, etc. The data 302 may be or include data communicated, for example, from the circuitry block 350, the sensor block 360, etc. In the example of FIG. 3, a choke block 340 can provide for transmission of data signals via the power cable 400 and the MLEs 500.

As shown, the MLEs 500 connect to a motor block 315, which may be a motor (or motors) of a pump (e.g., an ESP, etc.) and be controllable via the VSD/step-up transformer block 370. In the example of FIG. 3, the conductors of the MLEs 500 electrically connect at a WYE point 325. The circuitry block 350 may derive power via the WYE point 325 and may optionally transmit, receive or transmit and receive data via the WYE point 325. As shown, the circuitry block 350 may be grounded.

The system 300 can operate in a normal state (State A) and in a ground fault state (State B). One or more ground faults may occur for one or more of a variety of reasons. For example, wear of the power cable 400 may cause a ground fault for one or more of its conductors. As another example, wear of one of the MLEs may cause a ground fault for its conductor. As an example, gas intrusion, fluid intrusion, etc. may degrade material(s), which may possibly lead a ground fault.

The system 300 may include provisions to continue operation of a motor of the motor block 315 when a ground fault occurs. However, when a ground fault does occur, power at the WYE point 325 may be altered. For example, where DC power is provided at the WYE point 325 (e.g., injected via the choke block 340), when a ground fault occurs, current at the WYE point 325 may be unbalanced and alternating. The circuitry block 350 may or may not be capable of deriving power from an unbalanced WYE point and, further, may or may not be capable of data transmission via an unbalanced WYE point.

The foregoing examples, referring to "normal" and "ground fault" states, demonstrate how ground faults can give rise to various issues. Power cables and MLEs that can resist damaging forces, whether mechanical, electrical or chemical, can help ensure proper operation of a motor, circuitry, sensors, etc. Noting that a faulty power cable (or MLE) can potentially damage a motor, circuitry, sensors, etc. Further, as mentioned, an ESP may be located several kilometers into a wellbore. Accordingly, the time and cost to replace a faulty ESP, power cable, MLE, etc., can be substantial.

Figure 4:
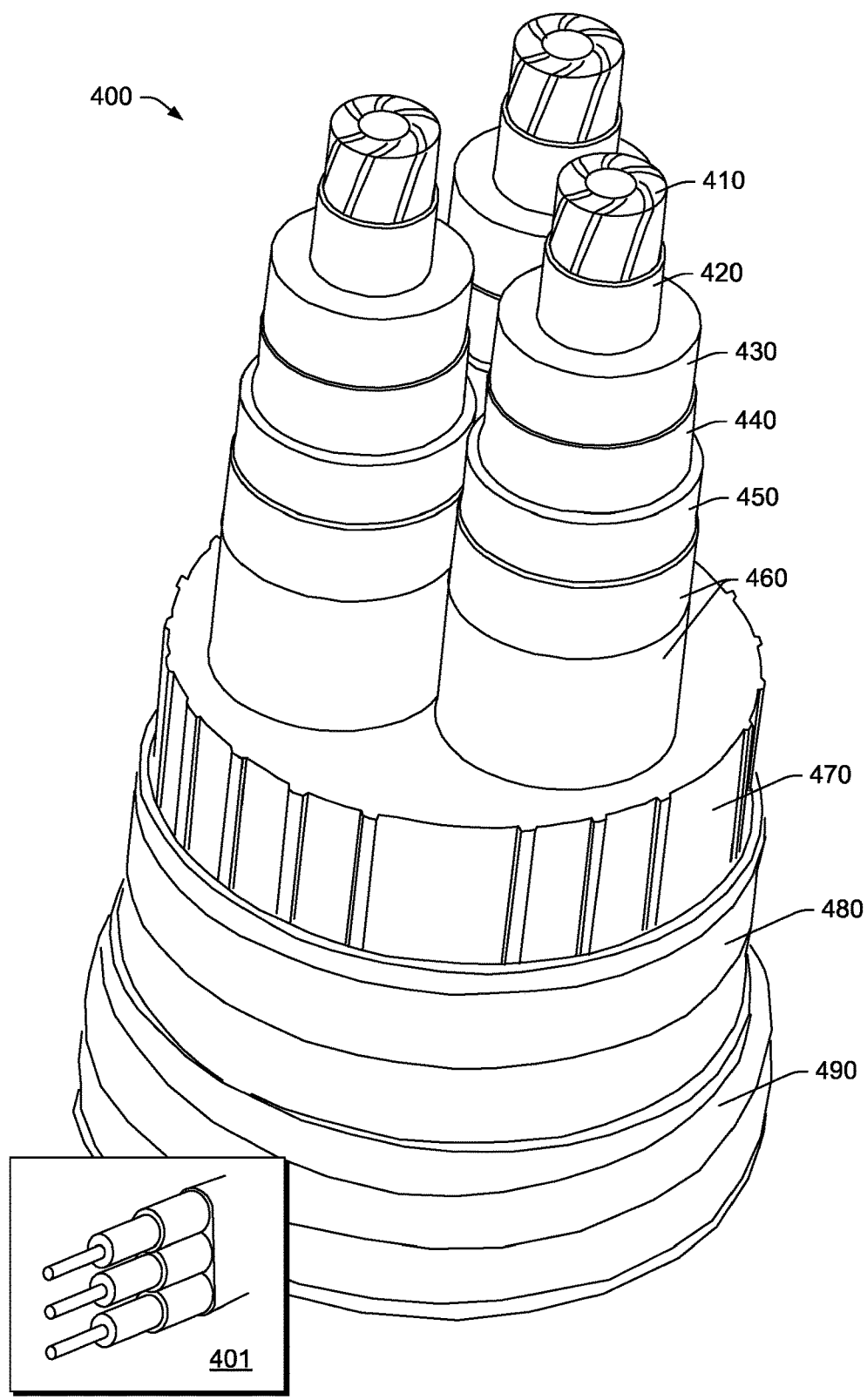
FIG. 4 illustrates examples of cables.

FIG. 4 shows an example of the power cable 400, suitable for use in the system 300 of FIG. 3 or optionally one or more other systems (e.g., SAGD, etc.). In the example of FIG. 4, the power cable 400 includes three conductor assemblies where each assembly includes a conductor 410, a conductor shield 420, insulation 430, an insulation shield 440, a metallic shield 450, and one or more barrier layers 460. The three conductor assemblies are seated in a cable jacket 470, which is surrounded by a first layer of armor 480 and a second layer of armor 490. As to the cable jacket 470, it may be round or as shown in an alternative example 401, rectangular (e.g., "flat").

As an example, a power cable may include, for example, conductors that are made of copper (see, e.g., the conductors 410); an optional conductor shield for each conductor (see, e.g., the conductor shield 420), which may be provided for voltage ratings in excess of about 5 kV; insulation such as high density polyethylene (HDPE), polypropylene or EPDM (e.g., where The E refers to ethylene, P to propylene, D to diene and M refers to a classification in ASTM standard D-1418; e.g., ethylene copolymerized with propylene and a diene or ethylene propylene diene monomer (M-class) rubber) dependent on temperature rating (see, e.g., the insulation 430); an insulation shield (see, e.g., the insulation shield 440), which may be provided for voltage ratings in excess of about 5 kV, where the insulation shield includes a polymeric material such as, for example, a nitrile rubber type of polymeric material (e.g., NBR, HNBR, etc.) and/or a metallic shield that may include metallic lead (Pb) (see, e.g., the metallic shield 450); a barrier layer that may include fluoropolymer (see, e.g., the barrier layer(s) 460); a jacket that may include oil resistant EPDM or nitrile rubber (see, e.g., the cable jacket 470); and one or more layers of armor that may include galvanized, stainless steel, MONEL™ alloy (marketed by Inco Alloys International, Inc., Huntington, W. Va.), etc. (see, e.g., the armor 480 and the armor 490).

As an example, the insulation shield 440 may be considered a barrier layer, for example, which may be formed of a continuous polymeric sheath as extruded about the insulation 430.

As an example, the metallic shield 450 may be considered a barrier layer, for example, which may be formed of a continuous metallic lead (Pb) sheath as extruded about the insulation 430 and/or the insulation shield 440, if present.

In some commercially available REDAMAX™ cables, polytetrafluoroethylene (PTFE) tape is used to form a barrier layer to block fluid and gas entry. For REDALEAD™ cables, metallic lead (Pb) is extruded directly on top of the insulation (see, e.g., the insulation 430 and/or the insulation shield 440) to help prevent diffusion of gas into the insulation (e.g., one or more corrosive gases). The high barrier properties and malleability of metallic lead (Pb) tend to make it a suitable candidate for downhole cable components.

As an example, manufacture of an inline longitudinal wrapped gas impermeable barrier may include utilizing with a lead (Pb) alloy (e.g., Pb—Sn—Sb crystal structure) tape. As an example, an inline longitudinal wrapped gas impermeable barrier that includes a lead (Pb) alloy tape for gas sealing may be disposed about individual insulated copper conductors within a multi-phase conductor assembly.

In the example of FIG. 4, as to the conductor 410, it may be solid or compacted stranded high purity copper and coated with a metal or alloy (e.g., tin, lead, nickel, silver or other metal or alloy). As to the conductor shield 420, it may optionally be a semiconductive material with a resistivity less than about 5000 ohm-m and be adhered to the conductor 410 in a manner that acts to reduce voids therebetween (e.g., consider a substantially voidless adhesion interface). As an example, the conductor shield 420 may be provided as an extruded polymer that penetrates into spaces between strands of the stranded conductor 410. As to extrusion of the conductor shield 420, it may optionally be co-extruded or tandem extruded with the insulation 430 (e.g., which may be or include EPDM). As an option, nanoscale fillers may be included for low resistivity and suitable mechanical properties (e.g., for high temperature thermoplastics).

As to the insulation 430, it may be bonded to the conductor shield 420. As an example, the insulation 430 can include EPDM.

As to the insulation shield 440, it may optionally be a semiconductive material having a resistivity less than about 5000 ohm-m. The insulation shield 440 may be adhered to the insulation 430, but, for example, removable for splicing (e.g., together with the insulation 430), without leaving a substantial amount of residue. As an example, the insulation shield 440 may be extruded polymer, for example, co-extruded with the insulation 430.

As an example, the insulation shield 440 can include one or more materials dispersed in a polymeric material where such one or more materials alter the conductivity of the insulation shield 440.

As to the metallic shield 450 and the barrier layer(s) 460, one or more layers of material may be provided. One or more layers may be provided, for example, to create an impermeable gas barrier. As an example, the cable 400 may include PTFE fluoropolymer, for example, as tape that may be helically taped.

As to the cable jacket 470, it may be round or as shown in the example 401, rectangular (e.g., "flat"). As to material of construction, a cable jacket may include one or more layers of EPDM, nitrile, hydrogenated nitrile butadiene rubber (HNBR), fluoropolymer, chloroprene, or other material (e.g., to provide for resistance to a downhole and/or other environment). As an example, each conductor assembly phase may include solid metallic tubing, such that splitting out the phases is more easily accomplished (e.g., to terminate at a connector, to provide improved cooling, etc.).

As to the cable armor 480 and 490, metal or metal alloy may be employed, optionally in multiple layers for improved damage resistance.

Figure 5:
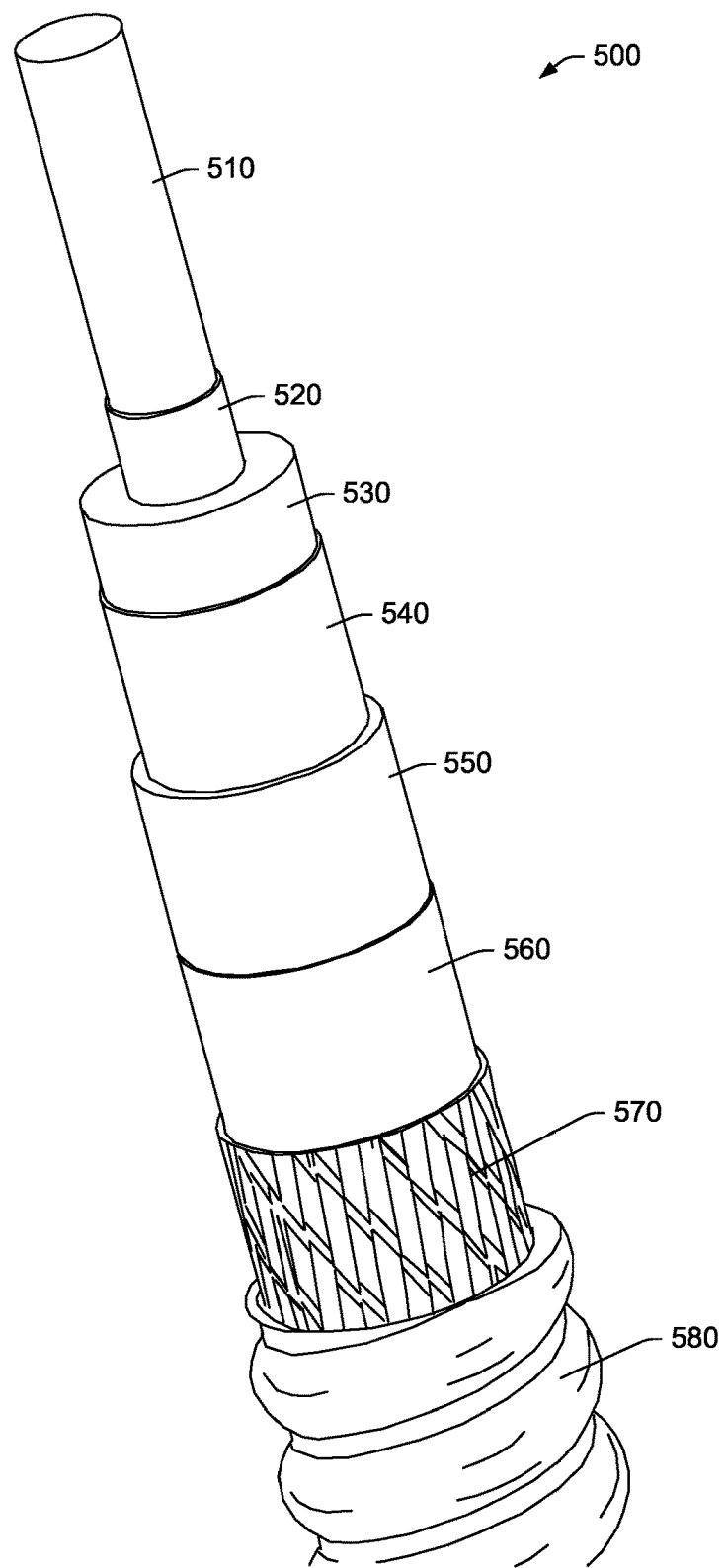
FIG. 5 illustrates an example of a motor lead extension.

FIG. 5 shows an example of one of the MLEs 500 suitable for use in the system 300 of FIG. 3 or optionally one or more other systems (e.g., SAGD, etc.). In the example of FIG. 5, the MLE 500 (or "lead extension") a conductor 510, a conductor shield 520, insulation 530, an insulation shield 540 and/or a metallic shield 550, one or more other barrier layers 560, a braid layer 570 and armor 580. While the example of FIG. 5 mentions MLE or "lead extension", it may be implemented as a single conductor assembly cable for one or more of a variety of downhole uses.

As to a braid or a braided layer, various types of materials may be used such as, for example, polyethylene terephthalate (PET) (e.g., applied as a protective braid, tape, fabric wrap, etc.). PET may be considered as a low cost and high strength material. As an example, a braid layer can help provide protection to a soft lead jacket during an armor wrapping process. In such an example, once downhole, the function of the braid may be minimal. As to other examples, nylon or glass fiber tapes and braids may be implemented. Yet other examples can include fabrics, rubberized tapes, adhesive tapes, and thin extruded films.

As an example, a conductor (e.g., solid or stranded) may be surrounded by a semiconductive material layer that acts as a conductor shield where, for example, the layer has a thickness greater than approximately 0.005 inch (e.g., approximately 0.127 mm). As an example, a cable can include a conductor with a conductor shield that has a radial thickness of approximately 0.010 inch (e.g., approximately 0.254 mm). As an example, a cable can include a conductor with a conductor shield that has a radial thickness in a range from greater than approximately 0.005 inch to approximately 0.015 inch (e.g., approximately 0.127 mm to approximately 0.38 mm).

As an example, a conductor may have a conductor size in a range from approximately #8 AWG (e.g., OD approx. 0.128 inch or area of approx. 8.36 mm$^2$) to approximately #2/0 "00" AWG (e.g., OD approx. 0.365 inch or area of approx. 33.6 mm$^2$). As examples, a conductor configuration may be solid or stranded (e.g., including compact stranded). As an example, a conductor may be smaller than #8 AWG or larger than #2/0 "00" AWG (e.g., #3/0 "000" AWG, OD approx. 0.41 inch or area of approx. 85 mm$^2$).

As an example, a cable may include a conductor that has a size within a range of approximately 0.1285 inch to approximately 0.414 inch (e.g., approximately 3.26 mm to approximately 10.5 mm) and a conductor shield layer that has a radial thickness within a range of approximately greater than 0.005 inch to approximately 0.015 inch (e.g., approximately 0.127 mm to approximately 0.38 mm).

Figure 6:
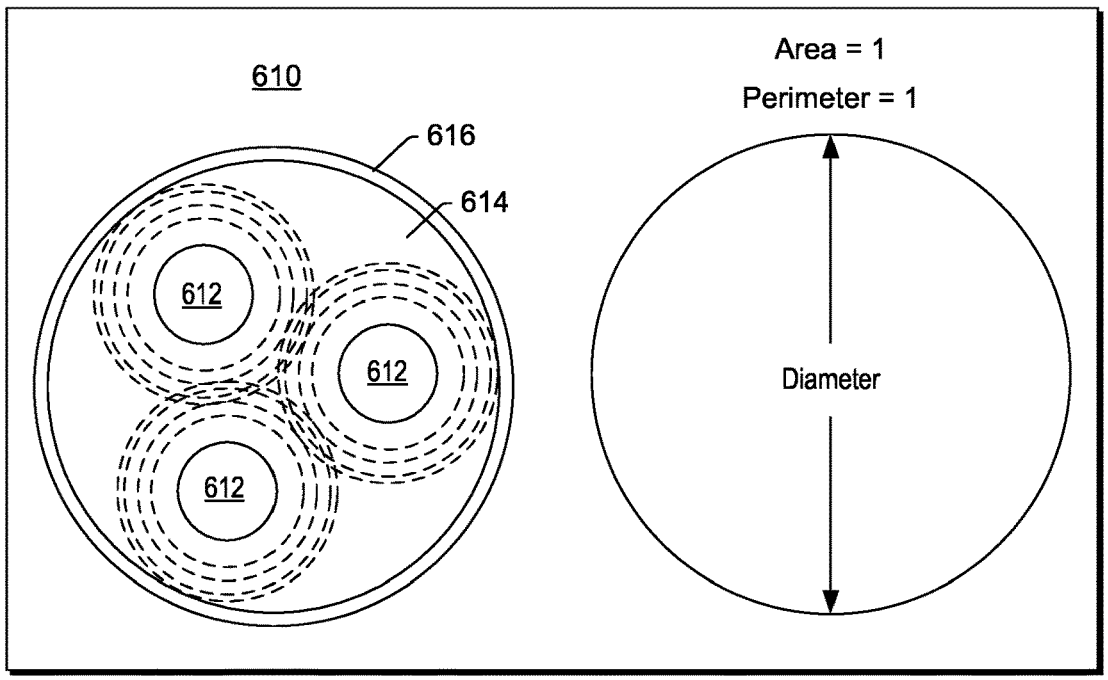
FIG. 6 illustrates examples of arrangements.
Figure 6:
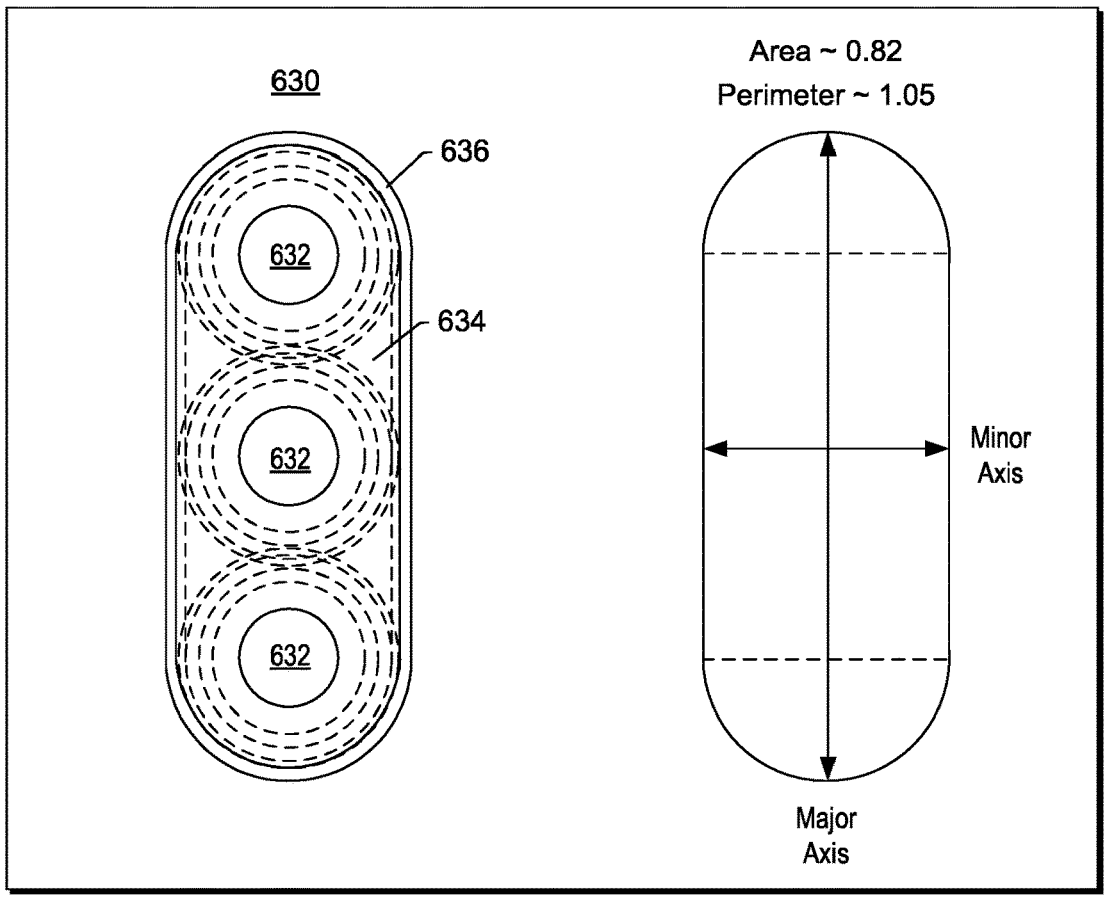

FIG. 6 shows an example of a geometric arrangement of components of a round cable 610 and an example of a geometric arrangement of components of an oblong cable 630. As shown the cable 610 includes three conductors 612, a polymeric layer 614 and an outer layer 616 and the oblong cable 630 includes three conductors 632, a polymeric layer 634 (e.g., optionally a composite material with desirable heat transfer properties) and an optional outer polymeric layer 636 (e.g., outer polymeric coat, which may be a composite material). In the examples of FIG. 6, a conductor may be surrounded by one or more optional layers, as generally illustrated via dashed lines. For example, as to the cable 630, consider three 1 gauge conductors (e.g., a diameter of about 7.35 mm) with various layers. In such an example, the polymeric layer 634 may encapsulate the three 1 gauge conductors and their respective layers where, at ends, the polymeric layer 634 may be about 1 mm thick. In such an example, an optional armor layer may be of a thickness of about 0.5 mm. In such an example, the optional outer polymeric layer 636 (e.g., as covering armor) may be of a thickness of about 1 mm (e.g., a 1 mm layer).

As shown in FIG. 6, the cable 610 includes a circular cross-sectional shape while the cable 630 includes an oblong cross-sectional shape. In the example of FIG. 6, the cable 610 with the circular cross-sectional shape has an area of unity and the cable 630 with the oblong cross-sectional shape has area of about 0.82. As to perimeter, where the cable 610 has a perimeter of unity, the cable 630 has a perimeter of about 1.05. Thus, the cable 630 has a smaller volume and a larger surface area when compared to the cable 610. A smaller volume can provide for a smaller mass and, for example, less tensile stress on a cable that may be deployed a distance in a downhole environment (e.g., due to mass of the cable itself).

In the cable 630, the conductors 632 may be about 7.35 mm (e.g., about 1 AWG) in diameter with insulation of about 2 mm thickness, metallic lead (Pb) of about 1 mm thickness (e.g., as a gas barrier layer), a jacket layer (e.g., the layer 634) over the lead (Pb) of about 1 mm thickness at ends of the cable 630, optional armor of about 0.5 mm thickness and an optional polymeric layer of about 1 mm thickness (e.g., the layer 636 as an outer polymeric coat). As an example, armor can include a strap thickness, which may be singly or multiply applied (e.g., double, triple, etc.). As an example, the cable 630 may be of a width of about 20 mm (e.g., about 0.8 inches) and a length of about 50 mm (e.g., about 2 inches), for example, about a 2.5 to 1 width to length ratio).

As an example, a cable may be formed with phases split out from each other where each phase is encased in solid metallic tubing.

As an example, a cable can include multiple conductors where each conductor can carry current of a phase of a multiphase power supply for a multiphase electric motor. In such an example, a conductor may be in a range from about 8 AWG (about 3.7 mm) to about 00 AWG (about 9.3 mm).

TABLE 1

Examples of Components.

| Cable Component | Dimensions |
| --- | --- |
| Conductor (Cu) | 8 AWG to 00 AWG (3.7 mm to 9.3 mm) |
| Insulation | 58 mils to 130 mils (1.5 mm to 3.3 mm) |
| Shield (e.g., Non-Metallic) | 10 mils to 25 mils (0.25 to 0.635 mm) |
| Metallic Shield | 20 mils to 60 mils (0.5 mm to 1.5 mm) |
| Jacket (e.g., optional) | 20 mils to 85 mils (0.5 mm to 2.2 mm) |
| Armor (e.g., optional) | 10 mils to 120 mils (0.25 mm to 3 mm) |
| Polymeric Coat (e.g., optional) | 20 mils to 60 mils (0.5 mm to 1.5 mm) |

In Table 1, the insulation can include a shield that is non-metallic and/or a shield that is metallic. For example, a metallic shield can be a lead (Pb) based shield that is relatively gas impermeable. As an example, a non-metallic shield may be relatively gas impermeable. As mentioned, insulation may be formulated as a compound with one or more alkane-based peroxides that can provide for radical polymerization where the one or more alkane-based peroxides form radicals that can form decomposition products, which may have a maximum molecular weigh less than about 100. In such an example, the decomposition products can be non-aromatic.

As an example, a cable may include conductors for delivery of power to a multiphase electric motor with a voltage range of about 3 kV to about 8 kV. As an example, a cable may carry power, at times, for example, with amperage of up to about 200 A or more.

As to operational conditions, where an electric motor operates a pump, locking of the pump can cause current to increase and, where fluid flow past a cable may decrease, heat may build rapidly within the cable. As an example, locking may occur due to gas in one or more pump stages, bearing issues, particulate matter, etc. As an example, a cable may carry current to power a multiphase electric motor or other piece of equipment (e.g., downhole equipment powerable by a cable).

As an example, in some flat power cable embodiments, two or more individual coated conductors can be arranged in a side-by-side configuration (e.g., consider configurations such as 2×1, 3×1, 4×1, etc.) and, for example, one or more armor layers can be applied over a jacket.

As an example, an insulation shield layer can optionally be a semiconductive layer applied over an insulation layer to minimize electrical stresses in a cable. In some embodiments, the insulation shield layer is formed from a hydrogenated nitrile butadiene rubber (HNBR). In some embodiments, the insulation shield layer is formed from a FEPM polymer, such as AFLAS® 100S polymer. In some embodiments, an insulation shield layer can be formed from a FKM polymer. In some embodiments, an insulation shield layer is extruded over an insulation layer. For example, in embodiments that include an HNBR insulation shield layer extruded over an EPDM insulation layer, the insulation shield layer may impart enhanced damage resistance in addition to improved resistance to well fluids and gases to the cable.

In some embodiments, an insulation shield layer may be substantially bonded to an insulation layer (e.g., via cross-linking, etc.). In other embodiments, an insulation shield layer may be adhered to an insulation layer using an appropriate adhesive or adhesives based on one or more of the respective materials of the insulation layer and insulation shield layer. In some embodiments, an insulation shield may be strippable (e.g., to allow for termination and electrical testing of the cable). As an example, insulation and shield may be strippable as a unit, for example, where substantially cross-linked at an interface between the insulation and the shield.

In some embodiments, an insulation shield layer can be applied via extrusion. For some embodiments, an insulation shield layer may be co-extruded with an insulation layer. In other embodiments, an insulation shield layer may be tandem extruded with an insulation layer. In yet other embodiments, an insulation layer may be extruded in a first extrusion process and an insulation shield layer applied as a partially completed cable is re-run back through the extruder, such as in a two-pass extrusion method.

In some embodiments, one or more compatibilizers may be used to help ensure that cross-linking occurs at an interface between an insulation layer (e.g., constructed from EPDM, etc.) and an insulation shield layer. In some embodiments, an insulation layer and insulation shield layer can be co-extruded via pressure extrusion and cured using compatible cure systems with substantially similar cure rates.

As an example, a metallic shield layer may be applied over an insulation shield layer. In such an example, the metallic shield layer may serve as a ground plane. In some embodiments, a metallic shield layer may serve to electrically isolate the phases of the cable from each other. As an example, a metallic shield layer may be formed from a number of metallic materials including, but not limited to: copper, aluminum, lead, and alloys thereof. In some embodiments, a metallic shield layer may be formed as a conductive material tape, braid, paint, or extrusion layer.

As an example, a metallic shield layer may be a type of barrier layer that aims to provide protection against migration of gas from an exterior region to an interior region. As an example, a lead (Pb) based barrier layer can be a metallic shield layer that can also serve as a ground plane.

As an example, a barrier layer can be a layer exterior to a shield (e.g., an insulation shield layer) that may aim to provide additional protection from corrosive downhole gases and fluids. In some embodiments, a barrier layer may be formed as an extruded layer while in other embodiments a barrier layer may be formed as a taped layer. In some embodiments, a barrier layer may be formed from one or more fluoropolymers, lead, or another material resistant to downhole gases and fluids. In some embodiments, a combination of extruded and taped layers may be used to form the barrier layer.

As an example, a cable jacket may offer fluid-, gas-, and/or temperature-resistance to a cable. In some embodiments, a jacket may be constructed from one or more layers of one or more materials (e.g., consider one or more of EPDM, nitrile rubber, HNBR, fluoropolymers, chloroprene, or another material offering suitable resistance to downhole conditions).

In some embodiments, a cable may use EPDM and/or nitrile based elastomer compounds in a jacketing layer. In some embodiments, one or more jacket layer compounds may be oil and/or water and/or brine and/or thermal and/or decompression resistant.

As an example, cable armor may be constructed from one or more of a variety of materials including, but not limited to, one or more of galvanized steel, stainless steel, MONEL™ alloy, or another metal, metal alloy, or non-metal resistant to downhole conditions. In some embodiments, cable armor can encase a plurality of wrapped conductors. In other embodiments, each wrapped conductor may be individually encased in its own cable armor.

As an example, a method can include covulcanization of two different polymeric materials. For example, EPDM and HNBR may be covulcanized, optionally at or proximate to an interface where a gradation may occur in composition from EPDM to HNBR, etc. (e.g., from a smaller radius to a larger radius). As an example, an extruder may allow for some amount of mixing of two molten materials that can be co-extruded. For example, consider a zone of a first material, a zone of mixed first and second materials and a zone of the second material.

As mentioned, an insulation compound can include EPDM and one or more alkane-based peroxides. In such an example, the insulation compound can include 2,5-dimethyl-2,5-di(t-butylperoxy)hexane, which is referred to as DBPH, as a curative (e.g., to cure EPDM as a base polymer). DBPH may be a commercially available product such as LUPEROX™ 101XL45 or VAROX™ DBPH-50.

As an example, an alkane-based peroxide can be, for example, consider 2,5-dimethyl-2,5-di(tert-butylperoxy)hexyne-3 (e.g., commercially available as VAROX™ 130-XL).

As an example, DBPH can have a linear formula [(CH$_3$)$_3$COOC(CH$_3$)2CH$_2$—]$_2$ with a molecular weight of 290.44 and a CAS number: 78-63-7 with chemical name: 2,5 Dimethyl 2,5 Di(tert-butylperoxyl) hexane. LUPEROX™ 101XL45 cross-linking peroxide is an approximately 45 percent active dispersion of LUPEROX™ 101 polymer initiator on a calcium carbonate filler. Curing of silicone rubbers, fluoroelastomers, and/or engineered rubber compounds may be performed under standard conditions above about 170 degrees C. Below about 140 degrees C., no premature cross-linking (scorch) is expected to occur.

In a powder form (e.g., supported on a powder substrate), a peroxide may be more readily mixed and homogenized.

As an example, in terms of parts per hundred of base polymer, consider a range of about 1 part peroxide(s) to about 10 parts peroxide(s) or optionally to about 15 parts peroxide(s). With a few unreactive polymers, cross-linking efficiency can be improved by the addition of about one to about five percent by weight of co-agents.

As mentioned, a polymeric insulation compound (e.g., a mixture of chemicals) may be formulated, cured to cause cross-linking and heated to promote release of non-cross-linked molecules and/or compounds to form an insulation layer in a manner that can minimize hexane extractable decomposition products. In such an example, a method can include minimizing the presence of nonvolatile peroxide decomposition byproducts via use of an alkane-based peroxide or alkane-based peroxides. For example, an alkane-based peroxide can decompose into peroxide decomposition products that do not include one or more aromatics and that are of a maximum molecular weight less than about 100 or, for example, less than about 78.11, which is the molecular weight of beneze (C$_6$H$_6$), which is an aromatic hydrocarbon or arene (e.g., a molecule with a ring or cyclical structure).

As an example, a method can include achieving a desired amount of uncross-linked base polymer, which can be a relatively low amount of uncross-linked base polymer, which correspondingly can provide for a relatively high amount of cross-linked base polymer. As an example, a method can include minimizing uncross-linked base polymer via use of an EPDM grade with active pendant dienes along with an active peroxide to generate a relatively high cross-link density. Dienes that can be used in the manufacture of EPDM include dicyclopentadiene (DCPD), ethylidene norbornene (ENB), and vinyl norbornene (VNB). As an example, an EPDM grade may be selected with ENB and/or VNB as active pendent dienes. As an example, an insulation can include cross-links formed via one or more pendent diene groups. In a polymeric insulation compound such groups can be readily available for radical polymerization associated with peroxide radials and thereby help to increase cross-linking in an insulation layer and to help reduce "free" residual chemicals in an insulation layer.

As mentioned, a cure co-agent (e.g., cure state promotor) can be included in a polymeric insulation compound to increase cross-linking. As an example, a high vinyl polybutadiene co-agent may be utilized. For example, consider one or more of the B Series homopolymer of butadiene (1,2-polybutadiene homopolymers) such as the B-3000 polymer (Nippon Soda Co., Tokyo, Japan), which has a number average molecular weight of about 3200 with a 1,2-vinyl microstructure of about 90 percent or more and a trans-1,4 microstructure of about 10 percent or less and a viscosity of about 210 poise at 45 degrees C. As another example, consider a polybutadiene resin such as RICON™ 153 polybutadiene resin (Cray Valley, Exton, Pa.), which is of a number average molecular weight of about 4700 with a 1,2 vinyl content of about 85 percent with nonvolatile material at about 98.5 percent by weight (minimum). As an example, a co-agent can be a Type II co-agent that provides desirable cross-link densities.

As an example, a method can include maintaining processability of a polymeric insulation compound via use of a relatively low molecular weight, broad MWD base polymer and cross-linkable process aid(s). Such an approach can help to reduce use of plasticizer oils (e.g., optionally relatively free of plasticizer oil). For example, a low molecular weight plasticizer can be utilized that includes groups that cross-link to a base polymer. In such an example, a polymeric insulation compound can be free of plasticizer oil. As such, "free" products as associated with plasticizer may be reduced in insulation that is interior to a gas barrier layer.

Figure 7:
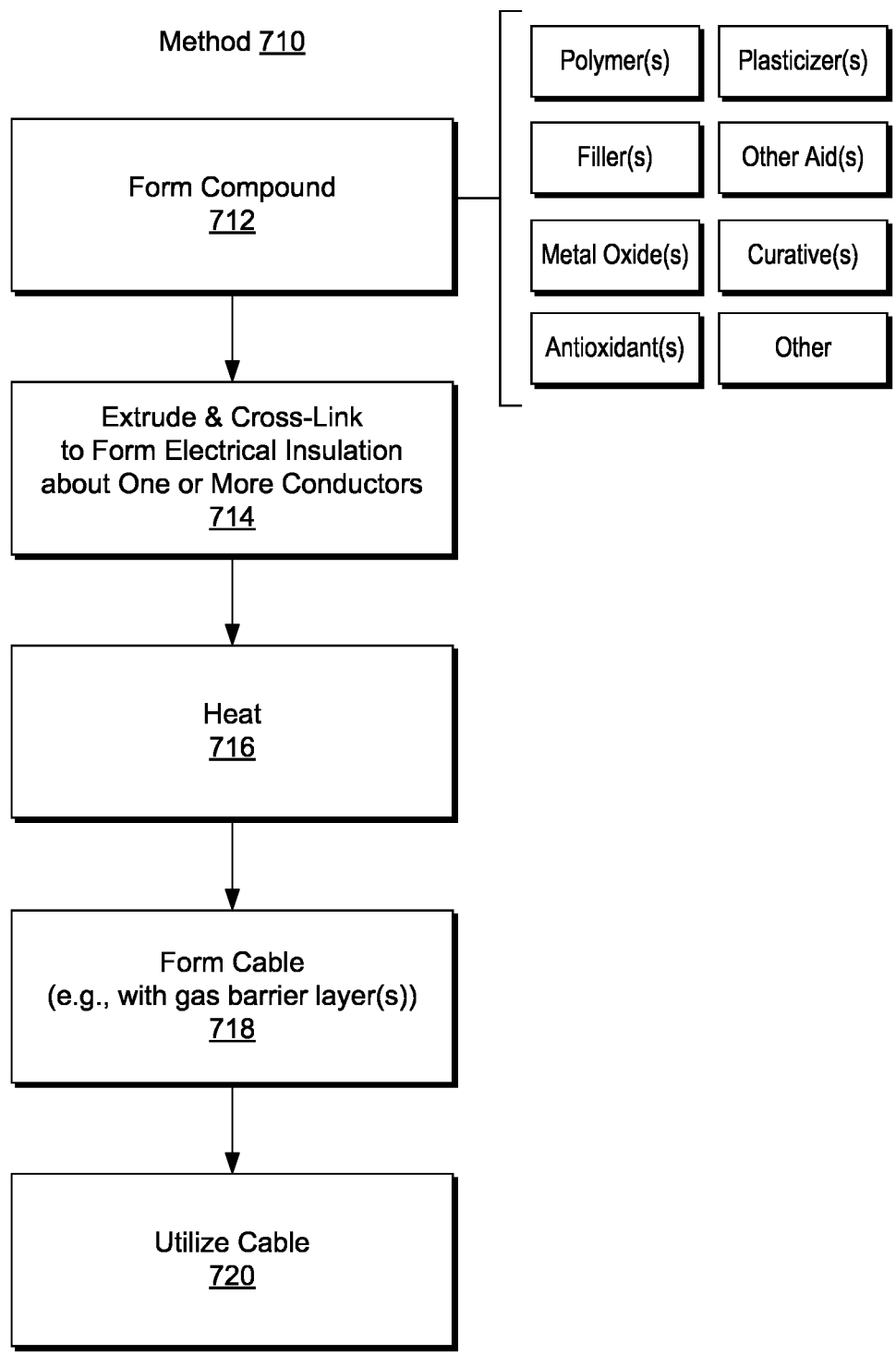
FIG. 7 illustrates an example of a method.

FIG. 7 shows an example of a method 710 that includes a formation block 712 for forming a compound that includes a base polymer (e.g., a polymeric insulation compound), an extrusion and cross-link block 714 for extruding and cross-linking at least a portion of the base polymer about one or more conductors to form electrical insulation, a heat block 716 for heating the electrical insulation as disposed about the one or more conductors, a formation block 718 for forming a cable that includes the one or more conductors as electrically insulated at least in part by the electrical insulation and a utilization block 720 for utilizing the cable, for example, by coupling the cable to a power supply and an electrical unit where the cable carries at least electrical power to the electrical unit. In such an example, the cable may be a multiphase power cable and the electrical unit may be or include a multiphase electric motor.

As an example, a method can include extruding an electrically insulating elastomeric compound about a conductor or conductors where the electrically insulating elastomeric compound includes ethylene propylene diene monomer (M-class) rubber (EPDM) and an alkane-based peroxide that generates radicals that form decomposition products and cross-linking the EPDM via radical polymerization to form an electrically insulating layer about the conductor. For example, consider the extrusion and cross-link block 714 of the method 710 of FIG. 7. In such an example, the method can include heating the cross-linked EPDM to at least 55 degrees C. to reduce the concentration of the decomposition products in the electrically insulating layer, for example, per the heat block 716 of the method 710 of FIG. 7. In such an example, the method can include disposing a gas barrier layer about the electrically insulating layer, for example, per the formation block 718 of the method 710 of FIG. 7.

In the example of FIG. 7, the formation block 718 can include disposing a gas barrier layer about (e.g., directly or indirectly) an electrical insulation layer formed by the cross-linking of at least the base polymer. Such a gas barrier layer can define an interior region and an exterior region where the heating of the heat block 716 can reduce the concentration of decomposition products in the electrical insulation layer before disposing the gas barrier layer. As mentioned, such an approach can help to preserve the integrity of the gas barrier layer. As an example, a gas barrier layer can be a metallic layer that acts as a ground plane.

As shown in the example of FIG. 7, the formation block 712 can include forming the compound (e.g., formulating the compound, etc.) via mixing of one or more polymers, one or more fillers, one or more metal oxides, one or more antioxidants, one or more plasticizers, one or more other types of process aids, one or more curatives and optionally one or more other materials. In such an example, the one or more polymers can include EPDM, as a peroxide curable elastomer, and the one or more curatives can include an alkane-based peroxide that reacts to form decomposition products that are non-aromatic decomposition products. As shown in the method 710 of FIG. 7, the formed compound of the formation block 712 can be fed to an extruder or extruders for extrusion per the extrusion and cross-link block 714.

Cross-linking characteristics of elastomeric polymers such as EPDM can determine physical properties such as tensile strength, compression set, recoverable elongations, tear energies, and dynamic performance. The quantity and quality of the linkages formed by cross-linking reactions can determine various properties of a resulting network. Networks formed from radical-based polymerization can possess acceptable heat-ageing stability and low compression set (e.g., based at least in part on chemical composition of cross-links that are formed). Synergistic use of multifunctional co-agents can alter these properties, for example, by increasing cross-link density of the network and/or by altering the cross-link composition.

A peroxide is a molecule or compound that includes an oxygen-oxygen single bond or the peroxide anion. As an example, a peroxide can be an organic peroxide such as, for example, an alkane-based organic peroxide. DBPH is an example of an organic peroxide that is an alkane-based organic peroxide. As an example, an oxygen-oxygen chemical bond of a peroxide can be relatively unstable and split into reactive radicals via homolytic cleavage. A radical can serve as an initiator of radical polymerization, a form of polymerization by which a polymer forms by successive addition of free radical building blocks.

Figure 8:
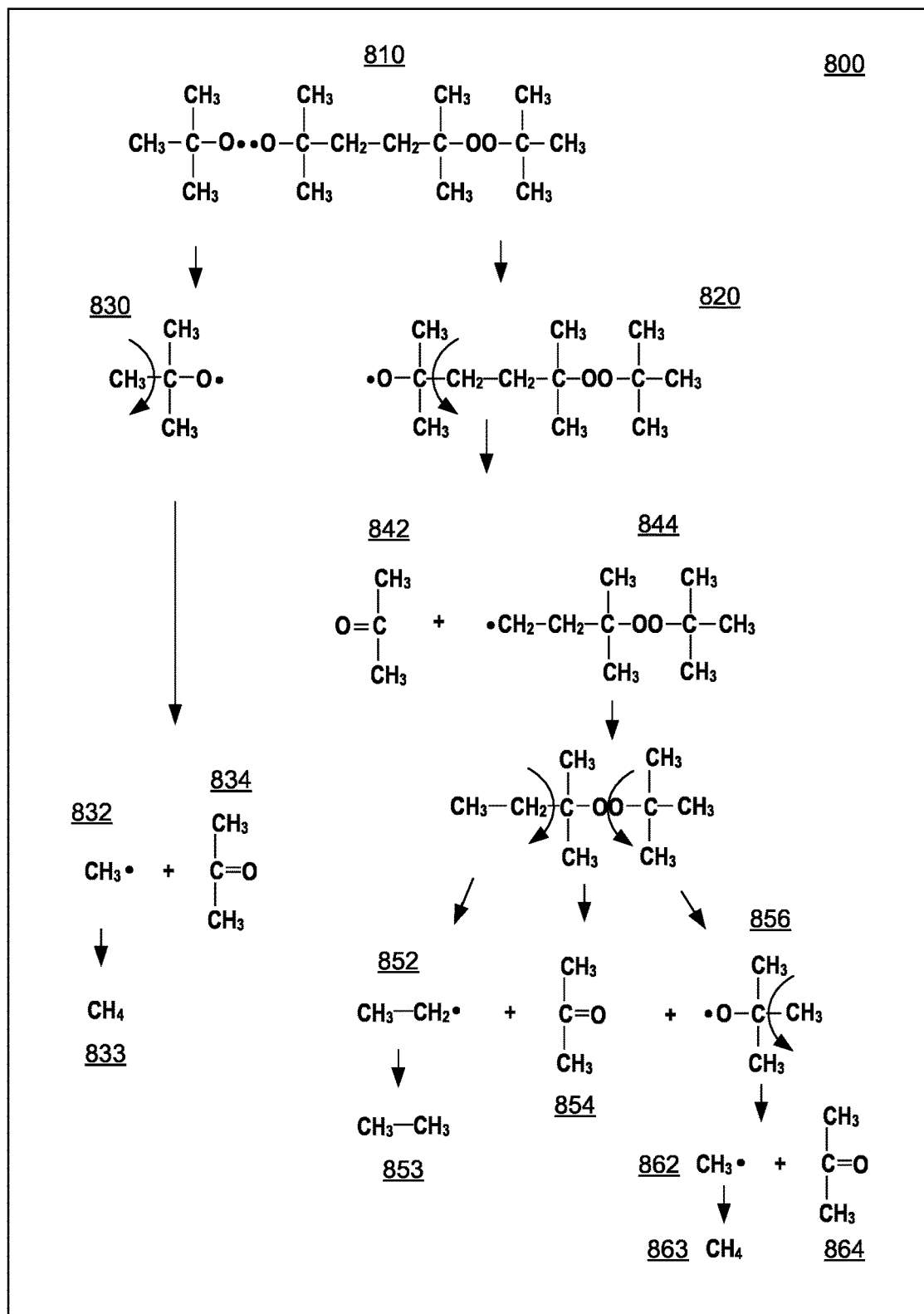
FIG. 8 illustrates examples of a decomposition pathways for an example of a peroxide.

FIG. 8 shows example decomposition pathways for an example of an alkane-based peroxide, which is 2,5-dimethyl-2,5-di(t-butylperoxy)hexane (DBPH). In FIG. 8, radicals 820, 830, 832, 844, 852, 856 and 862. Table 2 below summarizes the example decomposition products.

TABLE 2

Example Decomposition Products

|  | Number | Ref. No(s). in FIG. 8 | Mol. Weight | Total |
|---|---|---|---|---|
| DBPH | 1 | 810 | 290.44 | 290.44 |
| Hydrogen | 4 |  | 1.01 | 4.04 |
| Total |  |  |  | 294.48 |
| Acetone | 4 | 834, 842, 854, 864 | 58.08 | 232.33 |
| Ethane | 1 | 853 | 30.07 | 30.07 |
| Methane | 2 | 833, 863 | 16.04 | 32.08 |
| Total |  |  |  | 294.48 |

As shown in FIG. 8 and Table 2, the decomposition products have a maximum molecular weight of less than approximately 60 where the largest decomposition product is shown to be acetone, which is greater than approximately 75 percent of the total molecular weight of the decomposition products.

As shown in FIG. 8 and Table 2, DBPH decomposition results in non-aromatic decomposition products. These non-aromatic decomposition products can diffuse through material or materials as volatiles, for example, as organic vapors. The boiling point of acetone is about 56 degrees C. (vapor pressure of 374 kPa at 100 degrees C.), the boiling point of ethane is about −88 degrees C., and the boiling point of methane is about −161 degrees C.

As an example, a method such as the method 710 of FIG. 7 can include heating per the heat block 716 as a post cure process that includes heating insulated wire to a temperature or temperatures from about 50 degrees C. to about 150 degrees C. As an example, an elevate temperature in that range may be held for about 1 hour to about 24 hours. As an example, a lower temperature may be about 55 degrees, which is, for example, within about 6 degrees of a boiling point of acetone. As an example, a lower temperature that is an elevated temperature may be from about 50 degrees to about 56 degrees or more (e.g., up to about 150 degrees C.). As an example, a lower temperature may be about 56 degrees or more (e.g., up to about 150 degrees).

As an example, a method can include extruding an electrically insulating elastomeric compound about a conductor where the electrically insulating elastomeric compound includes ethylene propylene diene monomer (M-class) rubber (EPDM) and an alkane-based peroxide that generates radicals that form decomposition products; cross-linking the EPDM via radical polymerization to form an electrically insulating layer about the conductor; heating the cross-linked EPDM to at least 55 degrees C. to reduce the concentration of the decomposition products in the electrically insulating layer; and disposing a gas barrier layer about the electrically insulating layer.

As mentioned, a compound can include a base polymer. In some embodiments, a base polymer may be selected based at least in part on processability. For example, a base polymer may have low to medium viscosity, very broad molecular weight distribution, and a high degree of long chain branching. In some embodiments, the base polymer may have desirable heat aging characteristics which may be due in part to a high ethylene content (e.g., above about 60 percent) and a low diene content (e.g., below about 5 percent by weight). Some example materials include VISTALON™ 1703P and VISTALON™ 722 (ExxonMobil, Irving, Tex.) and NORDEL™ 3722 (The Dow Chemical Company, Midland, Mich.).

VISTALON™ 1703P EPDM is a polymer with a broad molecular weight distribution, moderate branching and a low diene content (e.g., about 0.9 weight percent VNB) where ethylene content is about 77 percent by weight. VISTALON™ 722 EPDM is a polymer with ethylene content of about 72 percent by weight. NORDEL™ 3722 EPDM is a polymer with an ethylene content of about 70 percent by weight and a diene level that is less than approximately 1 percent by weight. Where an EPDM has a low diene level, viscosity may be relatively low (e.g., less than about 30 Mooney viscosity at about 125 degrees C.).

As an example, a base EPDM polymer can include an ethylene content that is above approximately 60 percent by weight and a diene content less than about 5 percent by weight. As an example, a diene-based plasticizer can enhance processability (e.g., as to extrusion, etc.) and can cross-link to the base EPDM polymer. In such an example, a relatively high level of cross-linking may be achieved with a relatively low level of residual non-cross-linked plasticizer.

As mentioned, one or more low molecular weight plasticizers can be utilized that include groups that cross-link to a base polymer, which may be via pendent diene groups of the base polymer. As an example, such low molecular weight plasticizer or plasticizers may aid in processability. In such an example, a polymeric insulation compound can be free of plasticizer oil. As such, "free" products as associated with plasticizer may be reduced in insulation that is interior to a gas barrier layer.

As an example, a low molecular weight EPDM with a weight percent of diene greater than about 5 percent can be utilized as a plasticizer. For example, consider TRILENE™ polymers (Lion Copolymers LLC, Baton Rouge, La.) that are low molecular weight EPDM polymers where TRILENE™ 65 (DCPD) and 67 (ENB) are viscous liquids whereas TRILENE 77 (ENB) is a crystalline wax at room temperature. As an example, TRILENE™ 67 may be utilized in a polymeric insulation compound (e.g., a polymeric insulation formulation) where molecular weight is about 39,000 Da, ethylene/propylene is about 46/54 and where degree of unsaturation of ENB diene is at about 9.5 percent by weight. Such a polymer may be referred to as an ethylene-propylene-ethylidene norbornene low molecular weight polymer. As an example, TRILENE™ 77 may be utilized in a polymeric insulation compound (e.g., a polymeric insulation formulation) where molecular weight is about 27,000 Da, ethylene/propylene is about 74/26 and where degree of unsaturation of ENB diene is at about 10.5 percent by weight. Such a polymer may be referred to as an ethylene-propylene-ethylidene norbornene low molecular weight polymer. While some examples of plasticizers as processing aids or process aids are mentioned, various other aids may be utilized that include diene groups that can cross-link to EPDM that is a base polymer. For example, a process aid can be an EPDM with a first average molecular weight and diene groups at a first concentration or weight percent and a base polymer can be an EPDM with a second average molecular weight and diene groups at a second concentration or weight percent. In such an example, the process aid can be of a lower average molecular weight and a higher concentration or weight percent of diene, which can be, for example, ENB. As an example, in a polymeric insulation compound (e.g., formulation), a process aid or process aids may be present at about 0.2 to about 10 percent by weight or, for example, from about 0.2 to about 5 percent by weight or, for example, from about 0.2 to about 2 percent by weight. As an example, a process aid may be present at less than about 2 percent by weight but at greater than about 0.2 percent by weight.

As an example, to help maintain processability, a polymeric insulation compound can include a relatively low molecular weight and broad molecular weight distribution (MWD) base polymer and a cross-linkable process aid. In such an example, the base polymer can be a first EPDM and the cross-linkable process aid can be a second EPDM that is of lesser average molecular weight and greater in content as to unsaturated diene groups that can be available for cross-linking the second EPDM to the first EPDM.

As an example, a filler system can include, in some embodiments, a low moisture low volatile, dielectric material. In some embodiments, a vinyl silane treated kaolin clay may be, for example, selected based on performance. Some examples include TRANSLINK™ clay (e.g., 37 and/or 77) (BASF, Ludwigshafen, Germany). In some embodiments, other clays can be used, additionally or alternatively, and silane may be added in-situ. In some embodiments, thermally conductive fillers such as boron nitride or alumina may be added to help dissipate heat from a cable ampacity. Such one or more thermally conductive fillers may be added solely or alongside each other or standard (clay or silica) fillers, with an overall composition dependent on the desired thermal conductivity and mechanical property levels. As to clay, in a polymeric insulation compound, it may be present at a level in a range of about 40 phr to about 100 phr.

As to metal oxides, in some embodiments, one or more metal oxides may be added for heat stability. For example, a metal oxide may be selected from lead oxide, zinc oxide, and magnesium oxide, among others. In some embodiments, a metal oxide or metal oxides do not contain, or contain(s) a minimum amount of, process oils or non-elastomeric binders. As to metal oxide(s), in a polymeric insulation compound, one or more may be present at a level in a range of about 2 phr to about 10 phr. As an example, a metal oxide (e.g., lead oxide) may be present that can capture metal ions that may be residuals from EPDM catalyst(s) (e.g., consider use of a Zeiglar-Natta catalyst, one or more metallocene catalysts, etc.).

As to antioxidants, in some embodiments, one or more antioxidants may be used. An antioxidant package may include primary and secondary antioxidants to slow down degradation of elastomer due to oxygen aging. Primary antioxidants may include one or more of quinoline, phenol, and amine based polymers. As an example, an ethylenediaminetetraacetic acid may be utilized as an antioxidant.

As an example, synergistic effects may be observed if the primary antioxidant is combined with a secondary antioxidant for desired heat resistance (e.g., consider VANOX™ ZMTI and MTI, Vanderbilt Chemicals, LLC, Norwalk, Conn.). In some embodiments, an antioxidant package may have the lowest level of process oils and non-elastomer binder possible to help to avoid leaching out of the compounds under elevated temperature. As an example, a diphenylamine antioxidant can be utilized in a polymeric insulation compound. As an example, VANOX™ ZMTI antioxidant can work synergistically with one or more other antioxidants to improve heat resistance in peroxide-cured EPDM. As an example, VANOX™ ZMTI antioxidant and AGERITE™ Resin D (polymerized 1,2-dihydro-2,2,4-trimethylquinoline, Vanderbilt Chemicals, LLC, Norwalk, Conn.) antioxidant can be substantially non-interfering with a peroxide or peroxides (e.g., of a peroxide cure systems). As an example, consider a formulation with a ratio of about 2 VANOX™ ZMTI to about 1 AGERITE™ Resin D or another type of antioxidant). Such an approach can help improve aged strength and retention of properties in an EPDM base polymer insulation layer. As an example, a range of antioxidant(s) can be from about 0.5 phr to about 3 phr of each individual antioxidant utilized (e.g., from about 0.5 phr to about 6 phr for two antioxidants). Antioxidants can be dispersed such that long-term degradation of one or more chemicals in an insulation layer can be hindered via antioxidant action (e.g., capture of free radicals).

As to plasticizers, in some embodiments, one or more plasticizers may be used as an internal lubricant in a compound to control viscosity so that the compound is melt processable. As an example, a plasticizer may also swell and expand a base polymer for higher acceptance of fillers during internal mixing. In some embodiments, a non-extractable (fully cross-linkable) plasticizer is used. Such cross-linkable plasticizers may alter processability, cure kinetics and thermal stability of EPDM based compound. In some embodiments, the cross-linkable plasticizer can be a low to medium-low molecular weight polymer. In some embodiments, a polymer may have a high degree of saturation for desired heat resistance, but may also have some unsaturated sites (e.g., pendant sites) that can allow the material to achieve a desired amount of cross-linking with a base polymer matrix.

As to process aids, in some embodiments, one or more process aids may be used. A process aid may be used, for example, as an external lubricant during processing, such as extrusion, injection molding, etc., to ensure a smooth surface finish. One or more process aids may include very low molecular weight polymers that tend to bloom out to a surface. As an example, for high temperature applications such as SAGD steam pass, aggressive outgassing may occur if there are residual process aids in the compound that become volatile under heat. In some embodiments, process aids that are included to provide desired manufacturability may be at a minimal level (e.g., less than about 2 percent by weight).

As to curatives, in some embodiments, one or more curatives may be used. In some embodiments, a peroxide may be used to cure EPDM based elastomer(s) due to higher cross link density, higher compression set resistance as well as excellent heat aging properties. In some embodiments, a peroxide with a lowest amount of volatile cure byproducts may be used for high temperature stability. For example, a peroxide based curative can be di(t-butylperoxy)diisopropylbenzene, which may be referred to as VC and be available commercially as VOL-CUP™ (Arkema, Inc, Philadelphia, Pa.). On curing, this material creates byproducts of medium molecular weight polar components such as 1,4 diacetylbenzene (molecular weight of about 162.2). Thus, VC can be considered to be an aromatic-based peroxide where a decomposition pathway results in an aromatic decomposition product.

Where VC is utilized, the moderate stability of the byproducts (decomposition products of peroxide radical formation) allows them to persist in the compound through processing and post-curing, but volatilize and outgas when eventually exposed to ultra-high temp (e.g., above about 180 degrees C.) in downhole conditions.

As mentioned, an alkane-based peroxide or alkane-based peroxides may be used where decomposition products are non-aromatic. For example, consider an alkane-based peroxide where decomposition products have a molecular weight that is less than approximately 162 (e.g., less than the molecular weight of 1,4-diacetylbenezen) or, for example, less than approximately 78.11, which is the molecular weight of benzene.

As mentioned, DBPH may be utilized as an alkane-based peroxide. As shown in FIG. 8, DBPH may be classified as a peroxide that can decompose via various pathways to stable, low molecular weight decomposition products that can be volatile. For example, such decomposition products may be characterized by boiling points less than approximately 100 degrees C. or, for example, less than approximately 60 degrees C. As to DBPH, due to the high volatility of its post-reaction byproducts, DBPH can be a type of alkane-based peroxide that leaves minimal or no residual cure components in elastomers.

In some embodiments, after a high temperature EPDM insulation material has been extruded onto a conductor or conductors, post curing may occur. As mentioned with respect to the method 710 of FIG. 7, the heat block 716 can provide for heating that can promote post-curing. As an example, heating for post-curing may include heating insulated conductor(s) from about 80 degrees C. to about 150 degrees C. for a period of time that may be in a range from about 4 hours to about 24 hours.

A post cure procedure that includes heating may aim to: allow residual curative to degrade and complete one or more cross-linking reactions (e.g., to maximize cross-link density); allow polar residual curative byproducts (e.g., decomposition products) to bloom and/or outgas out of the compound; allow remaining hydrocarbon volatiles or short chain organics to outgas; and/or allow for dry out of residual moisture absorbed by the insulation during a steam cure process. As an example, a post cure procedure or procedures may aim to more fully cure insulation compound and drive off a relatively high percentage of volatiles (e.g., organic volatiles that may be decomposition products).

As an example, an EPDM insulated cable may provide for a temperature rating that is in excess of approximately 232 degrees C. (e.g., about 450 degrees F.). Such a cable may be rated at such a temperature without experiencing rupture that can be due to outgassing of volatiles that may be decomposition products of a peroxide or peroxides. As an example, an EPDM insulated cable can include a relatively impermeable lead (Pb) layer (e.g., a lead (Pb) jacket) where, interior to the lead (Pb) layer, the percentage of peroxide decomposition products is less than approximately 5 percent by weight in an insulation layer that is an EPDM insulation layer.

As an example, an EPDM insulated cable may be rated for SAGD well operations. For example, consider operating an EPDM cable where steaming past an ESP string may occur. In such an operation, a system can be installed and high temperature steam (e.g., about 250 degrees C. to about 265 degrees C.) pumped through an equipment well along with an injection well. By injecting steam from both wells, an operator can heat a formation faster and produce desired fluid(s) from the well sooner. Such a process may also save a well workover. Without a cable that is able to reliably stand temperatures up to about 265 degrees C. during the steaming past process, such a production method may be classified as high risk.

The method 710 of FIG. 7 may aim to produce a cable (e.g., ESP cable) with high temperature stability of an EPDM compound. Such a method can include tailoring a compound formulation with EPDM as a base polymer, post curing the compound and allowing for thermal expansion in the cable design.

As to cable construction such as in the formation block 718 of the method 710 of FIG. 7, consider, as an example, the following cable elements: conductor, insulation, lead (Pb) jacket, additional barrier(s) and armor.

As to copper conductor, in some embodiments, the conductor may be oversized for the application to decrease the possibility of heating from ampacity. For example, a #2 AWG (diameter of about 6.54 mm) may be used where without concern for ampacity a #4 AWG (diameter of about 4.89 mm) may be used (e.g., a larger diameter conductor may be utilized, which may be referred to as an oversized conductor).

As to EPDM insulation, in some embodiments, the EPDM insulation may also be oversized to create a more robust dielectric layer. For example, where an about 1.5 mm (e.g., about 0.058 inch) wall thickness would be used an about 1.7 mm (e.g., about 0.068 inch or greater) wall may be used.

As to a lead (Pb) jacket, in some embodiments, the lead jacket may also be oversized to help maintain the integrity of the lead jacket and help to prevent high temperature well fluids and gases from attacking the EPDM insulation and deteriorating electrical properties. In some embodiments, the lead jacket may be covered with a cushion material to protect it from thermal expansion of the underlying EPDM pushing it into the armor and crushing it. In some embodiments, the cushion may be braided fiber, wrapped tapes, or extruded polymer. In some embodiments, the cushion may be thick enough to compensate for thermal expansion of the underlying components.

As to one or more additional barriers, in some embodiments, the lead jacket may also be further protected by such one or more additional barriers. For example, wrapped PTFE tapes may be used to slow or prevent corrosion of the lead.

As to armor, in some embodiments, the cable may include an armor layer. For example, a galvanized steel strip may be used in high temperature applications. In some embodiments, a double-wrapped armor may be used. In some embodiments, a MONEL™ alloy armor may be used for improved corrosion resistance.

Data from examples described in Table 3 are shown in various plots. Six high temperature formulations appear in Table 3, with different cross-linkable process aids and non-blooming peroxides with a base formulation.

TABLE 3

Formulations as in Example Plots

| High temp formulation | X-linkable process aid | Peroxides |
|---|---|---|
| HT 1.1 | Combo of aid 1 and 2 | Peroxide 1 |
| HT 1.2 | Combo of aid 1 and 2 | Peroxide 2 |
| HT 2.1 | aid 1 | Peroxide 1 |
| HT 2.2 | aid 1 | Peroxide 2 |
| HT 3.1 | aid 2 | Peroxide 1 |
| HT 3.2 | aid 2 | Peroxide 2 |

In Table 3, the process aid 1 is a low molecular weight EPDM with diene (ENB) at about 9.5 percent by weight, which provides a reactive site to cross-link into a base EPDM polymer. As the molecular weight is low, viscosity is reduced to facilitate processability.

Peroxides considered as associated with data in various plots include LUPEROX™ 101XL45 (DBPH 45) as peroxide 1, DI-CUP™ 40KE as peroxide 2 (Arkema, Inc, Philadelphia, Pa.) and VUL-CUP™ 40KE as in FX (Arkema, Inc, Philadelphia, Pa.).

Figure 9:
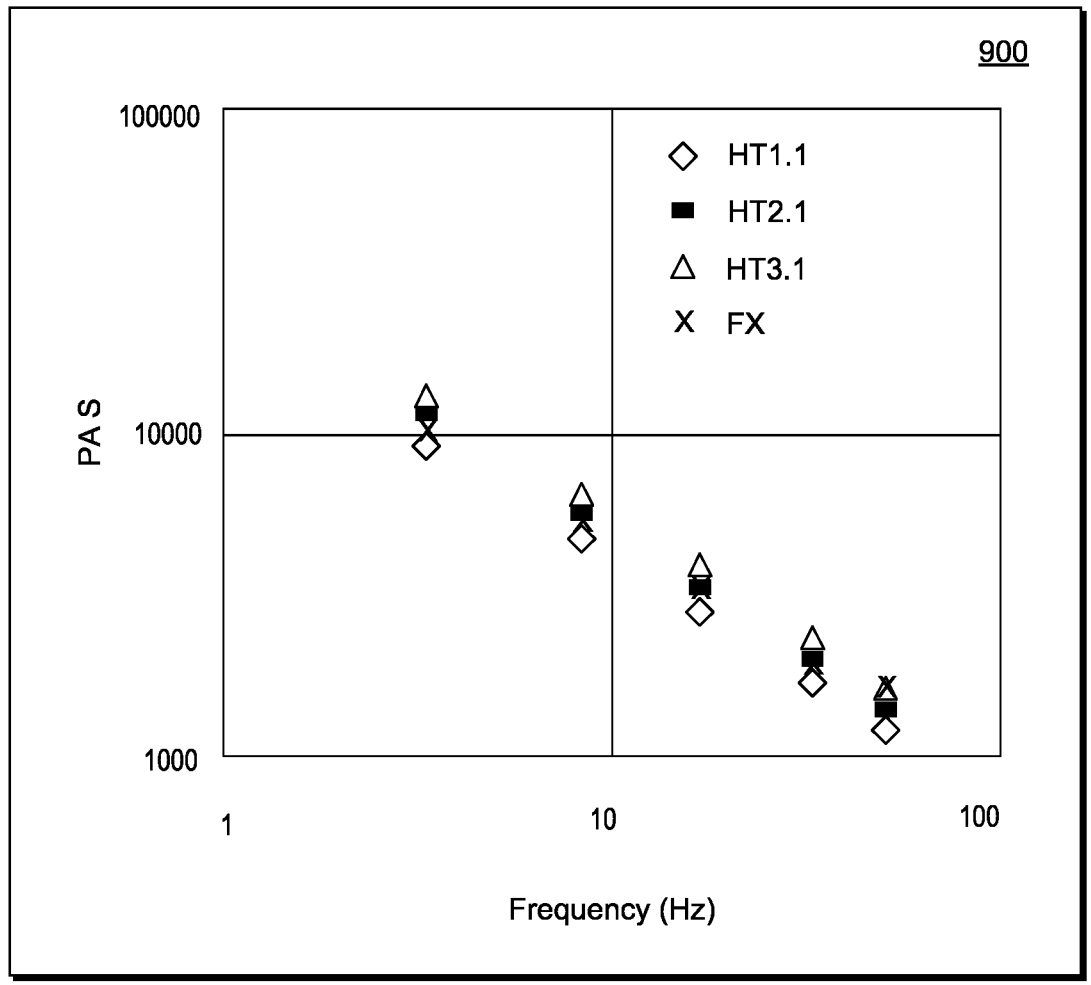
FIG. 9 illustrates an example of a plot.
Figure 10:
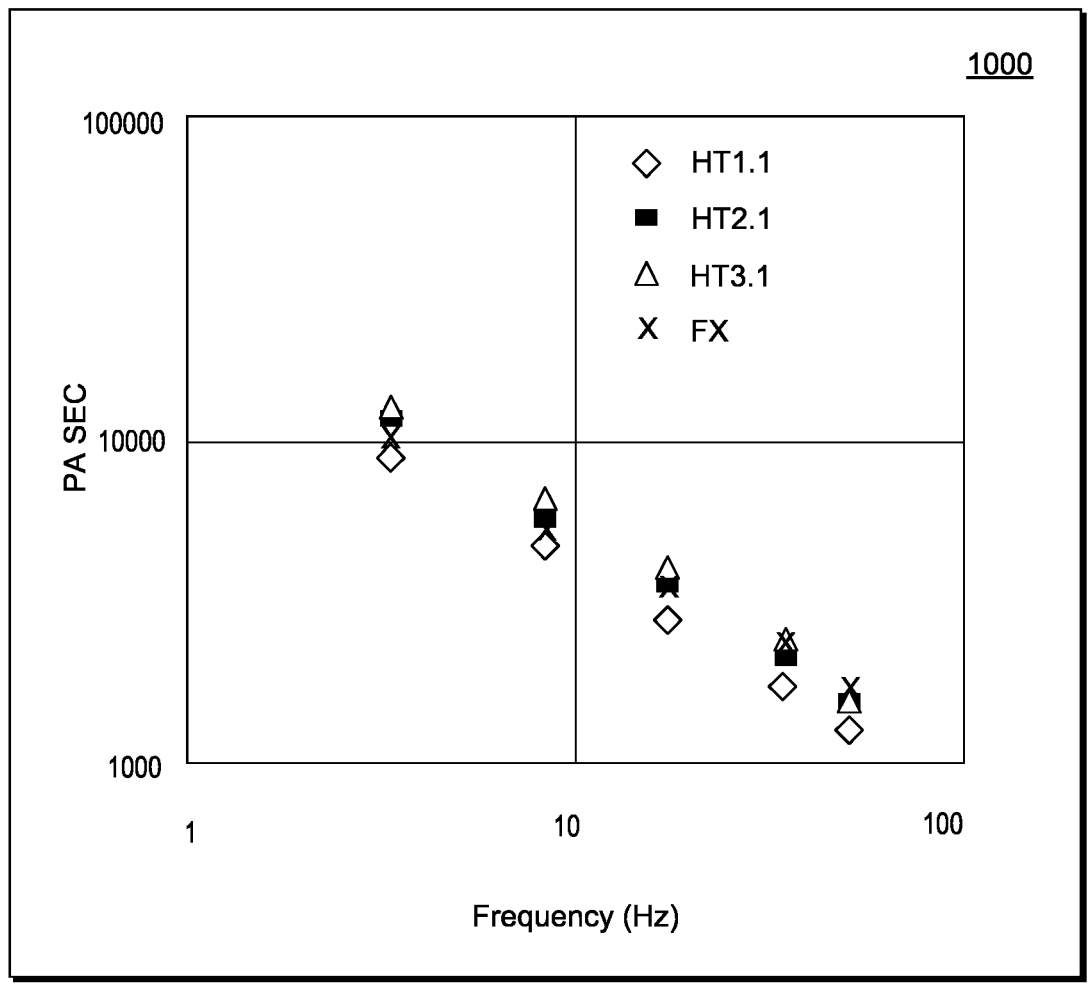
FIG. 10 illustrates an example of a plot.

FIGS. 9 and 10 show example plots 900 and 1000 for a viscosity-frequency sweep as to data that includes two types of non-blooming peroxides. The slope of the curve is an indicator of processability. The steeper slope observed in the HT materials versus the formulation FX (VUL-CUP™ 40KE) results in lower viscosity at higher shear rate, which is indicative of improved processing for the HT materials compared to the formulation FX materials.

Figure 11:
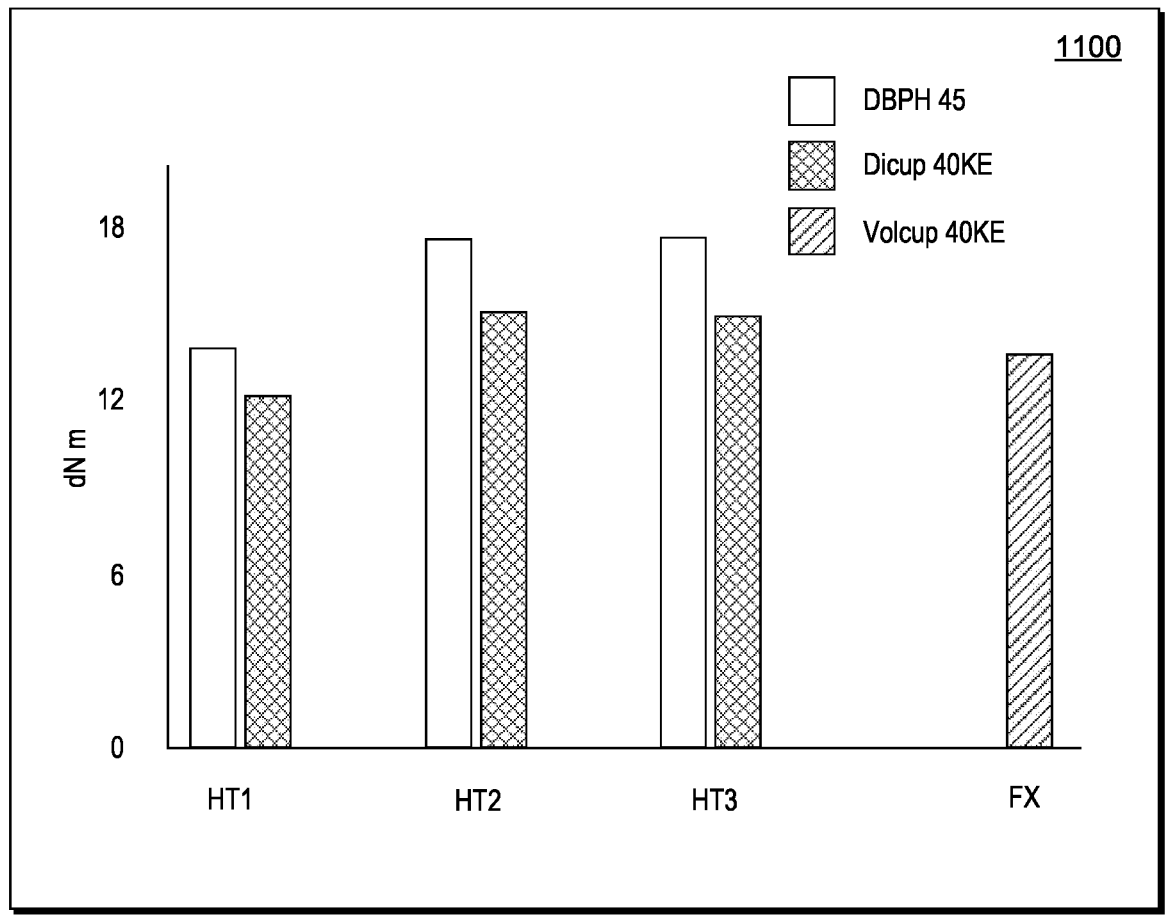
FIG. 11 illustrates an example of a plot.

FIG. 11 shows an example plot 1100 for cross-link efficiencies of different formulation. In the data of the plot 1100, cross-link density is given as measured by the RPA 2000™ Dynamic Mechanical Rheological Tester (Alpha Technologies, Akron, Ohio). In the plot 1100, HT 2 and HT 3 both show high S'max–S'min compared to the formulation FX (VUL-CUP™ 40KE), which indicates that the compound is highly cross-linked by replacing the non x-linkable process additives with x-linkable additives without reducing processability.

Figure 12:
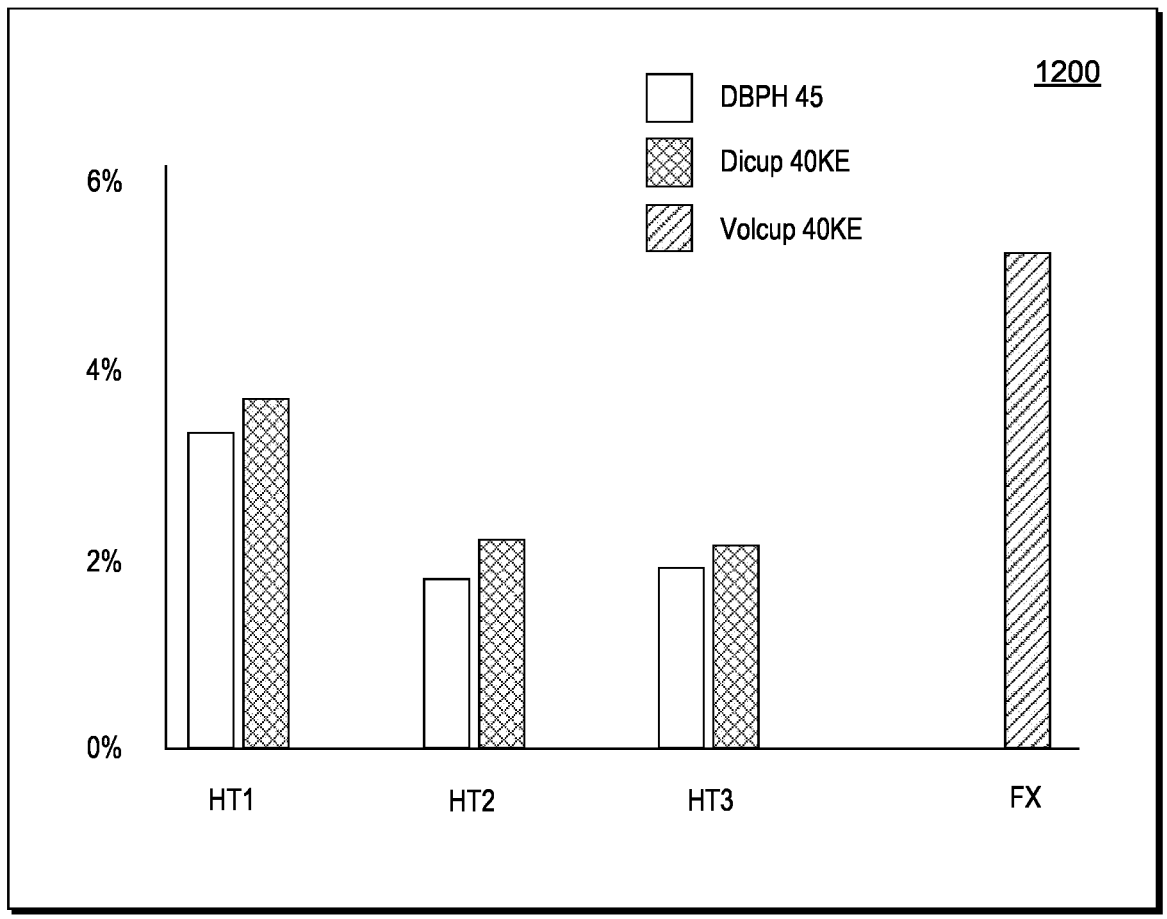
FIG. 12 illustrates an example of a plot.

FIG. 12 shows an example plot 1200 for the percentage of non x-linkable species in the compound by running Soxhlet extraction using hexane as a solvent. In the plot 1200, HT 2 and HT 3 show much less extractables for peroxide 1 compared to the formulation FX (VUL-CUP™ 40KE). The lower amount of extractable directly correlates to the high cross-link density of the compound and enhanced thermal stability of the formulation at elevated temperature due the extractables being low molecular weight ethylene propylene polymer that were not readily incorporated into the polymer matrix during vulcanization. Thermal analysis (TGA) indicates that those species start to thermally degrade at a temperature lower than about 250 degrees C.

Figure 13:
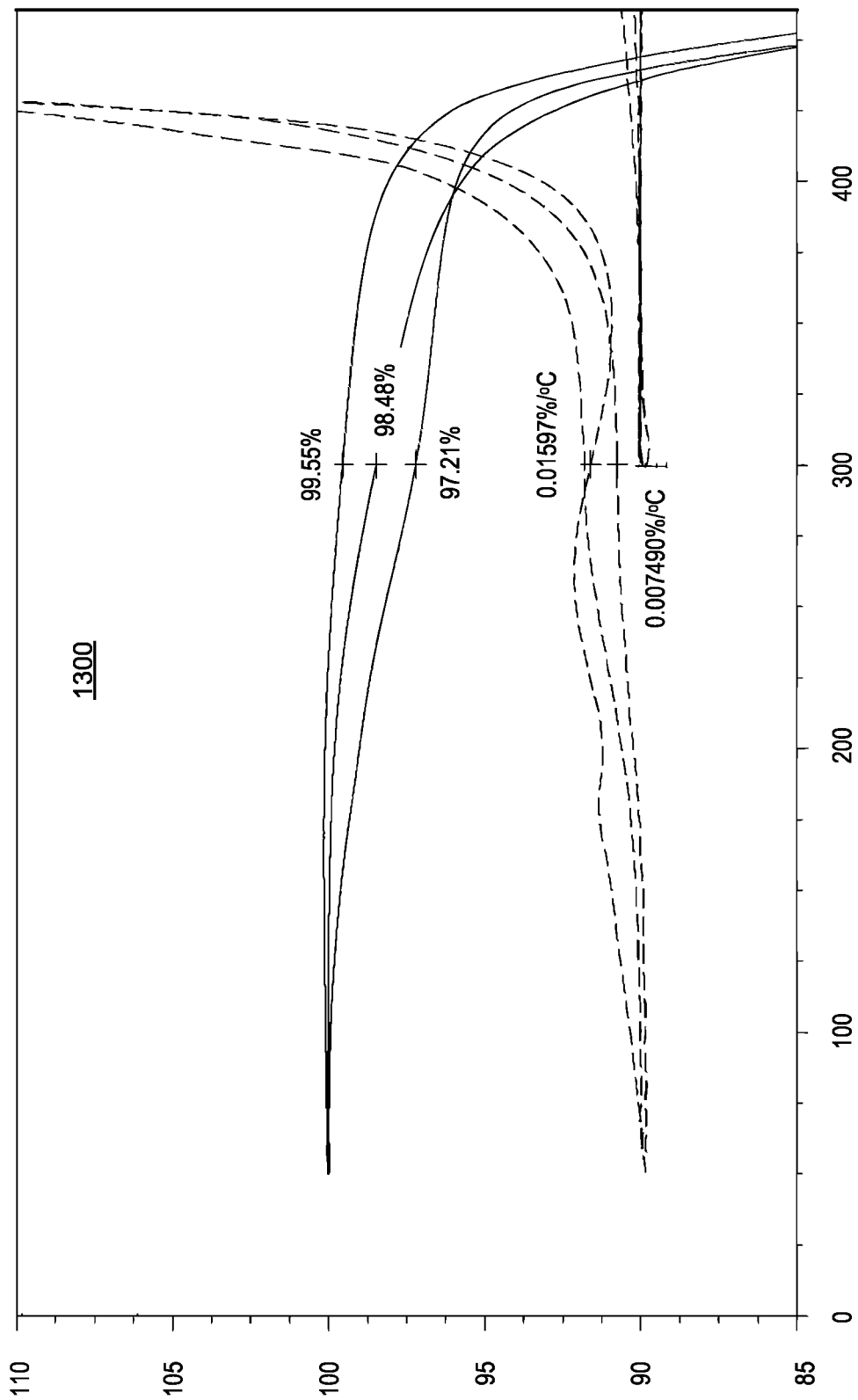
FIG. 13 illustrates an example of a plot.

FIG. 13 shows an example plot 1300 that compares the formulation FX and another 250 degree C. rated EPDM insulation based compound (FX 250) to the formulation HT 2.2 in terms of thermal stability. The weight loss at 300 degrees C. are about 0.45 percent for HT 2.2, about 1.52 percent for formulation FX and about 2.79 percent for the other formulation FX 250. In the plot 1300, the dashed lines show the derivative weight loss versus temperature.

Figure 14:
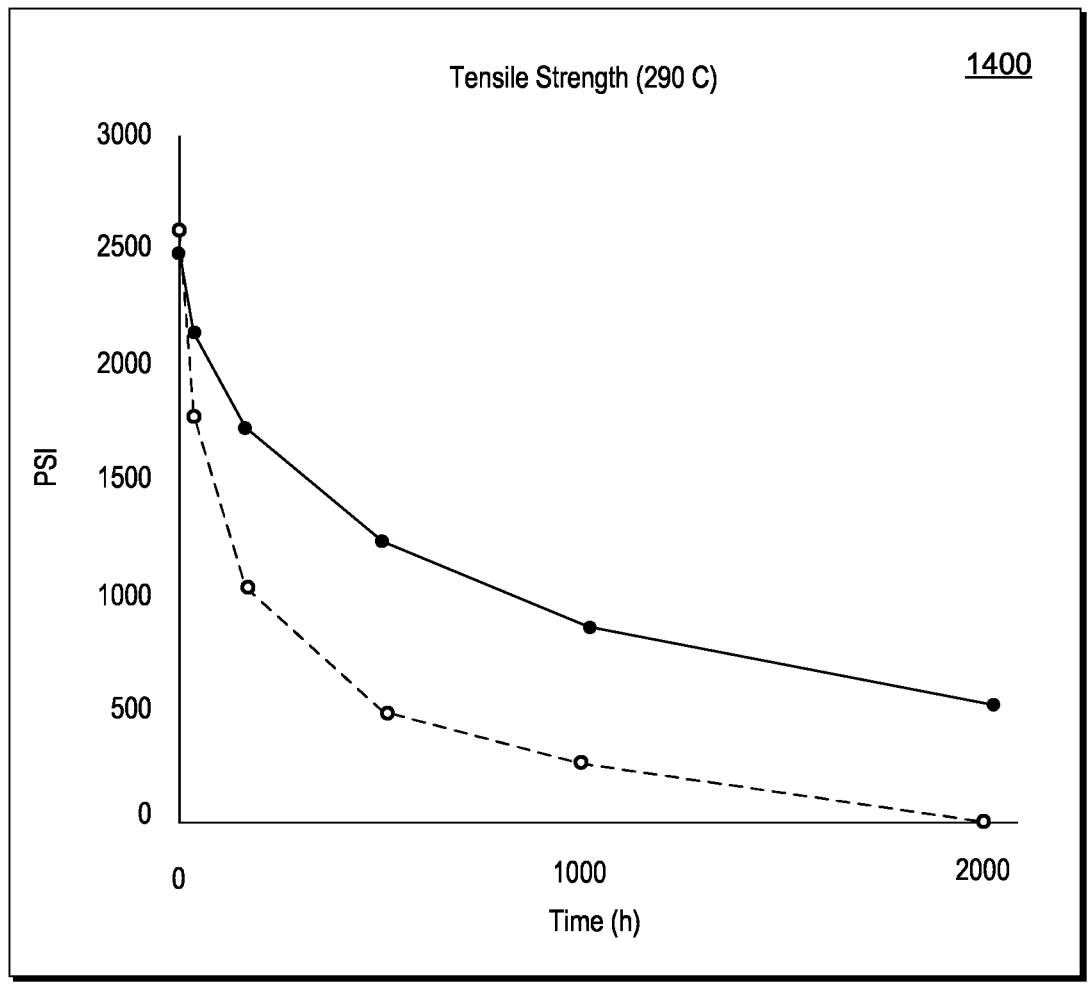
FIG. 14 illustrates an example of a plot.

FIG. 14 shows an example plot 1400 of tensile strength versus time at a temperature of about 290 degrees C. The higher tensile strength data are for insulation based on a formulation that includes EPDM with an alkane-based peroxide (DBPH).

Figure 15:
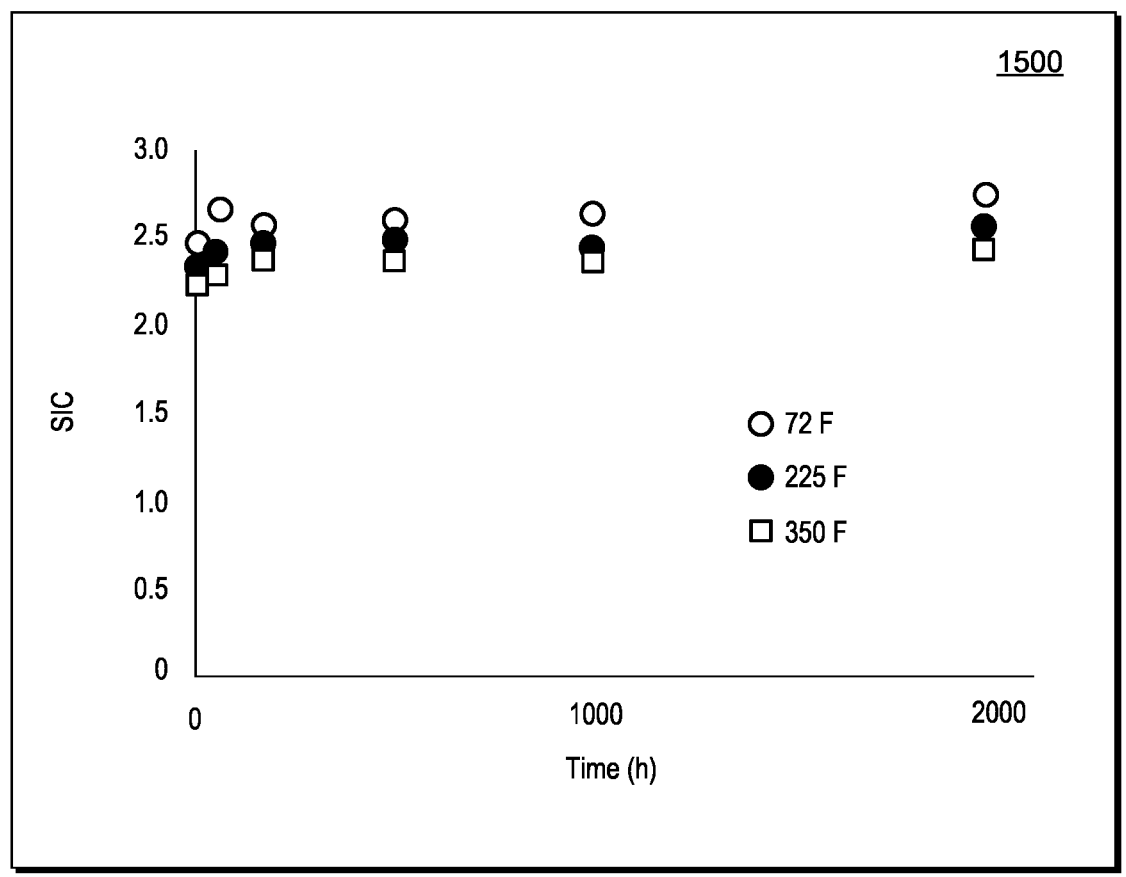
FIG. 15 illustrates an example of a plot.

FIG. 15 shows an example plot 1500 of dielectric constant versus time for three temperatures, 72 degrees F., 225 degrees F. and 350 degrees F. for insulation based on the formulation that includes EPDM with an alkane-based peroxide (DBPH) as aged in an oxygen depleted environment.

Figure 16:
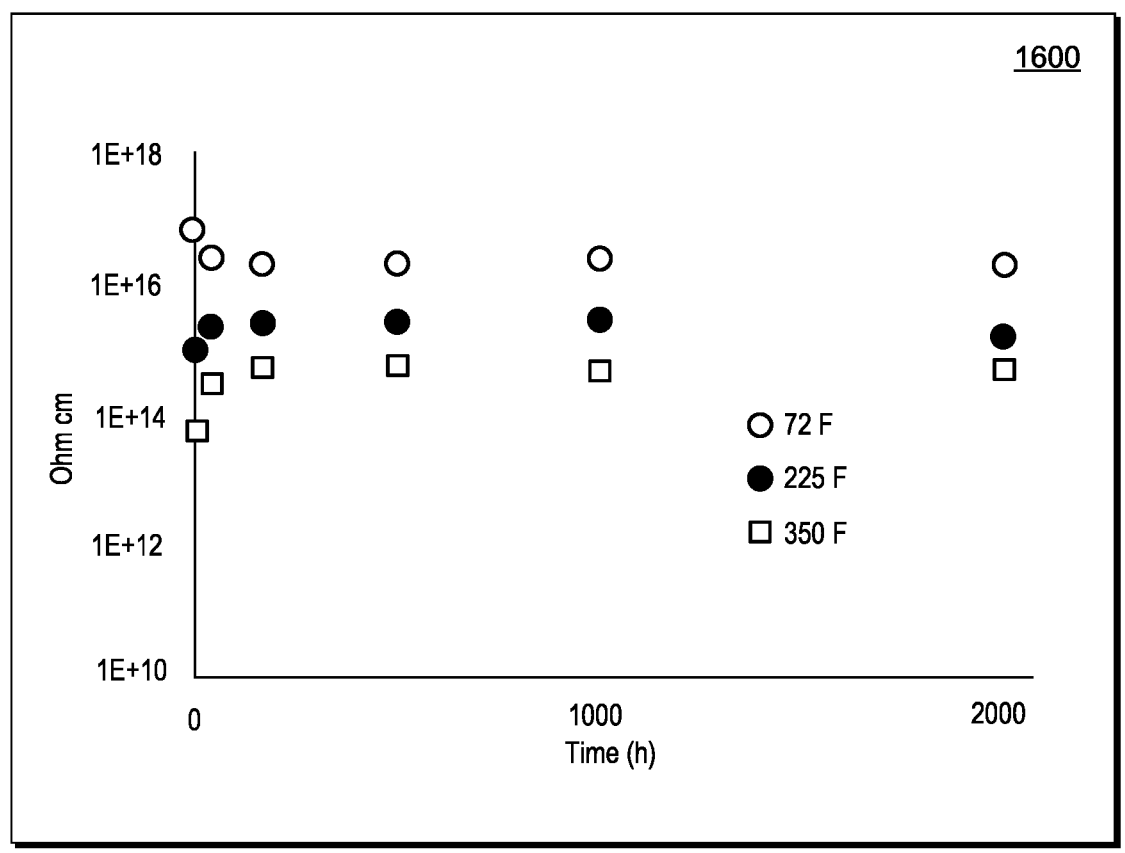
FIG. 16 illustrates an example of a plot.

FIG. 16 shows an example plot 1600 of resistivity versus time for three temperatures, 72 degrees F., 225 degrees F. and 350 degrees F. for insulation based on the formulation that includes EPDM with an alkane-based peroxide (DBPH) as aged in an oxygen depleted environment.

Figure 17:
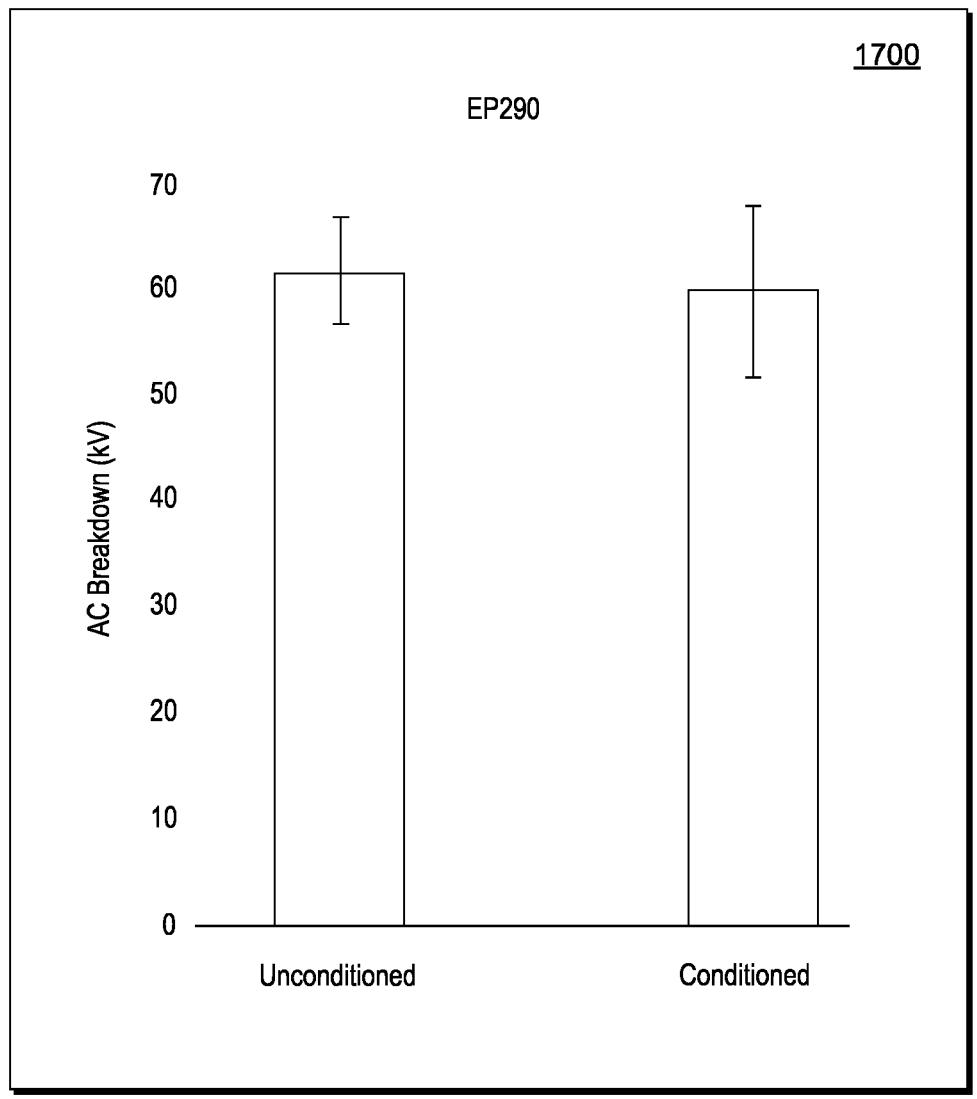
FIG. 17 illustrates an example of a plot.

FIG. 17 shows an example plot 1700 of alternating current (AC) breakdown voltage in kilovolts (kV) for an unconditioned and a conditioned EPDM insulated conductor based on a formulation that includes EPDM with an alkane-based peroxide (DBPH). Conditioning is ageing in an oxygen depleted environment for a period of approximately 28 days at approximately 290 degrees C. As shown, the AC breakdown voltage is decreased by about 2 kV, from about 62 kV to about 60 kV.

Figure 18:
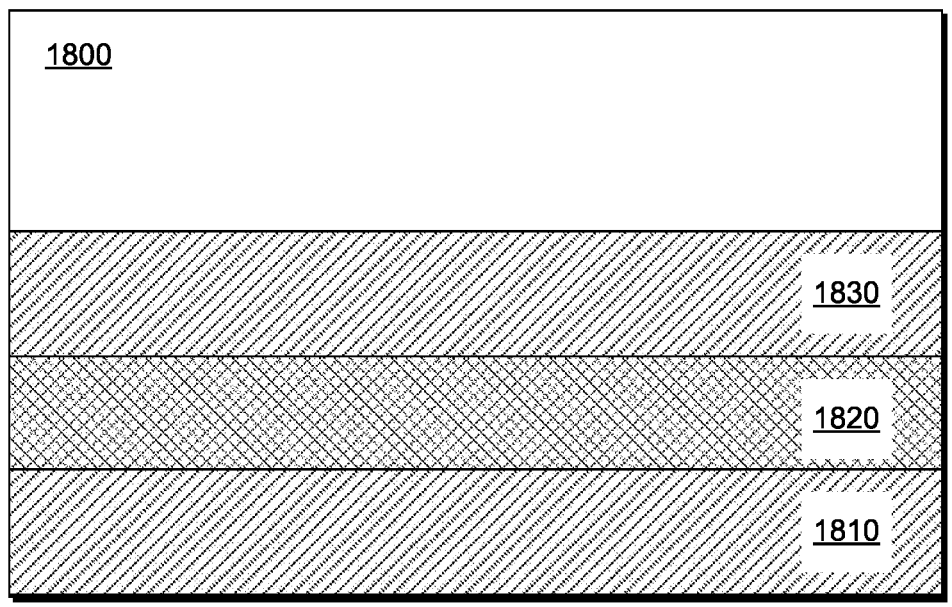
FIG. 18 illustrates an example of a portion of an insulated conductor with a shield.
Figure 18:
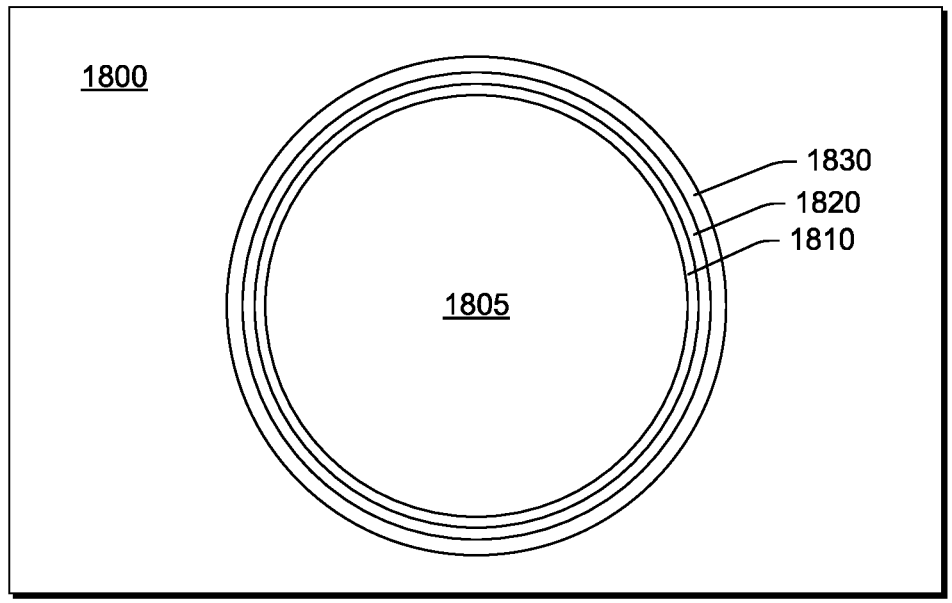

FIG. 18 shows a portion of a power cable 1800 that includes one or more conductors 1805 and layers 1810, 1820 and 1830.

In the example of FIG. 18, the one or more conductors 1805 may be formed from a raw conductor material (e.g., copper) that has been drawn to a standard wire size, annealed, and plated in either a stranded or solid configuration. A material may form the layer 1810, which may be optional, about the conductor or conductors 1805, which may be a treatment material. As shown in FIG. 18, the one or more conductors 1805 is(are) insulated with an insulation layer 1820 that includes EPDM as formed using one or more alkane-based peroxides. As shown in FIG. 18, the layer 1830 may be, for example, a lead (Pb) barrier layer, that may be referred to, for example, as a jacket. The layer 1830 may be applied over each EPDM insulation layer 1820 depending on a configuration of conductors in a cable. In some embodiments, one or more additional layers may disposed over a barrier layer such as a lead (Pb) jacket. The one or more additional layers may be a cushioning layer or layers and/or PTFE tape. As an example, a cable can be wrapped by armor.

In some round cable embodiments, two or more individual coated conductors can be twisted together before armor is applied. In some round cable embodiments, a plurality of individual coated conductors can be braided together before armor is applied. In some round cable embodiments, a power cable includes three conductors.

In some embodiments, a power cable may include one or more conductors, an EPDM insulation layer disposed over each conductor, and a lead (Pb) jacket disposed over the EPDM insulated conductor(s).

A round power cable may be used as power cable in an electric submersible pumping system.

In some flat power cable embodiments, two or more individual coated conductors can be arranged in a side-byside configuration (e.g., a 2×1, 3×1, or 4×1 configuration) and an armor layer can be applied over a jacket. In some embodiments, a flat power cable may include one or more conductors, an EPDM insulation layer disposed over each conductor, a lead (Pb) jacket disposed over each EPDM insulation layer, an optional additional layer (e.g., a cushioning layer or PTFE tape layer), and an armor layer.

A flat power cable may be used as a power cable in an electric submersible pumping system.

In some power cable embodiments, a power cable has a temperature rating above approximately 240 degrees C. In some embodiments, the power cable has a temperature rating above approximately 250 degrees C. In some embodiments, a power cable has a temperature rating above approximately 260 degrees C. In some embodiments, a power cable has a temperature rating of approximately 265 degrees C. In some embodiments, a power cable has a temperature rating between approximately 240 degrees C. and about 270 degrees C.

As an example, a plasticizer can include molecular polymer groups that can cross-link into an insulation material via exposure to peroxide that can generate radicals.

As an example, a heating process can include heating insulation to about 275 F post cure or approximately 130 degrees C.) for baking off lighter weight components (e.g., decomposition products).

As an example, a cable may be a medium voltage power cable for an application where lead sheathed cables can be utilized and where high temperature exposure or high cable reliability is desired. As an example, a cable may be free of or relatively free of dielectric materials such as, for example, fluoroplastics and/or PEEK.

Figure 19:
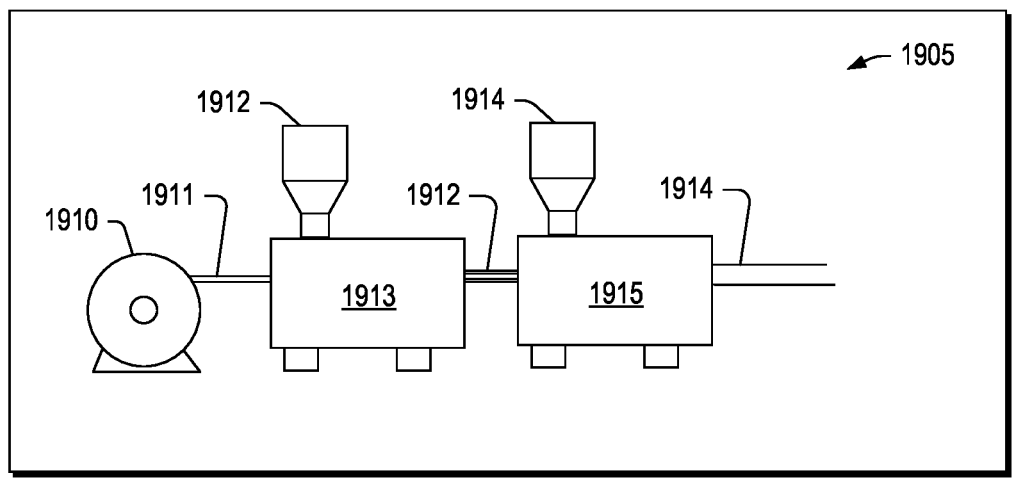
FIG. 19 illustrates examples of processing equipment.
Figure 19:
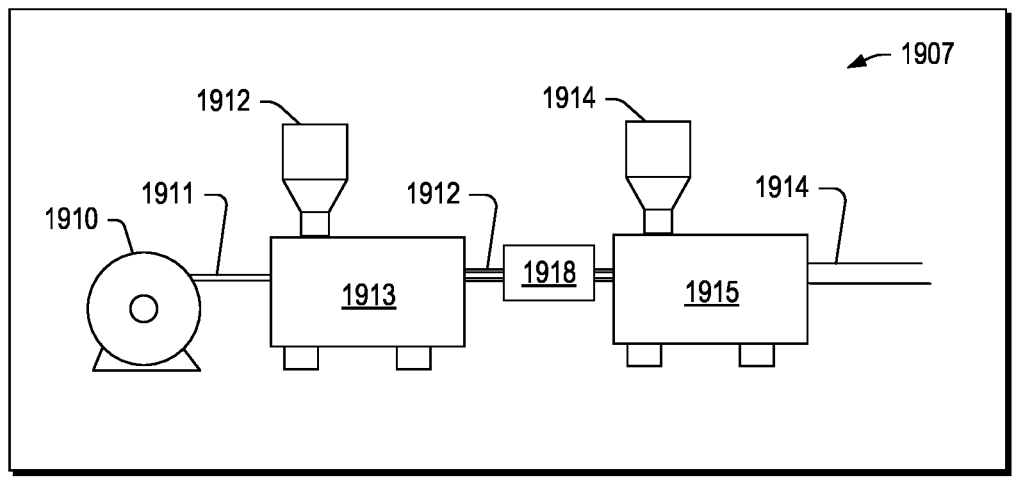
Figure 19:
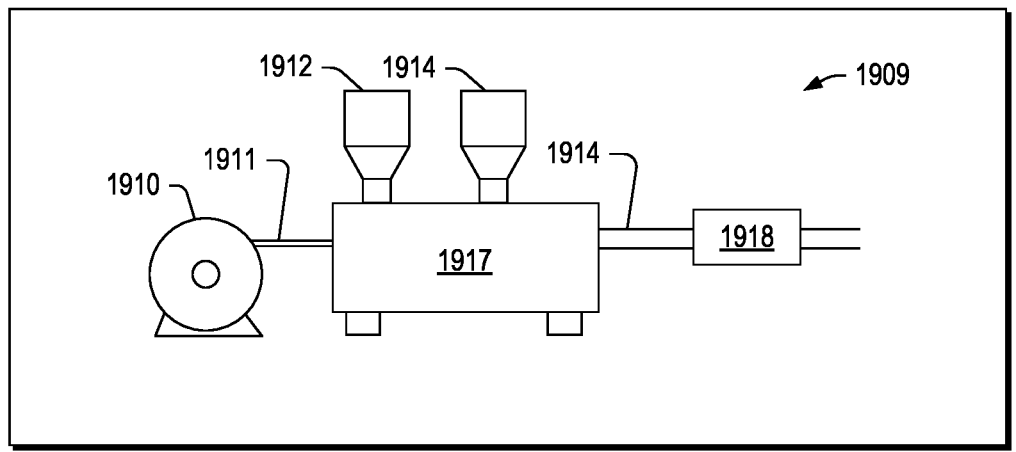

FIG. 19 shows examples of processing equipment 1905, 1907 and 1909. As shown, the processing equipment 1905 can include a reel 1910 that carries a conductor 1911 for translation to a first extruder 1913 fed with a first material 1912 that can be extruded about the conductor 1911 and then translated to a second extruder 1915 fed with a second material 1914 that can be extruded about the first material 1912. As an example, the processing equipment 1905 can deposit insulation as the first material and can deposit an insulation shield as the second material. In such an example, one or more processing conditions may be adjusted to allow for an amount of surface modification of the first material prior to deposition of the second material. In such an example, the amount of surface modification may correspond to curing of the first material. Such an example may allow for control of an amount of cross-linking of the second material to the first material.

As shown, the processing equipment 1907 can include the reel 1910 that carries the conductor 1911 that can be translated to the first extruder 1913 fed with the first material 1912 that can be extruded about the conductor 1911, and then translated to the second extruder 1915 fed with the second material 1914 that can be extruded about the first material 1912. The processing equipment 1907 further includes equipment 1918, which may be, for example, one or more types of equipment that can be used to alter properties of the first material 1912. For example, the equipment 1918 can be a hot air oven that can expedite curing of at least a portion of the first material 1912 prior to entry to the second extruder 1915.

As an example, the processing equipment 1907 can deposit insulation as the first material and can deposit an insulation shield as the second material. In such an example, one or more processing conditions (e.g., optionally of the equipment 1918) may be adjusted to allow for an amount of surface modification of the first material prior to deposition of the second material.

As shown in FIG. 19, the processing equipment 1909 includes various components of the processing equipment 1905; however, a single extruder 1917 is included that can co-extrude the first material 1912 and the second material 1914. In such an example, the first and second materials 1912 and 1914 may be deposited in a simultaneous manner about the conductor 1911 as the conductor 1911 is translated through the extruder 1917. In such an example, the conductor 1911 may be coated with a conductor shield or other material.

As shown, the processing equipment 1909 may optionally further include equipment 1918, which may be, for example, one or more types of equipment that can be used to alter properties of the first material 1912 and/or the second material 1914. For example, the equipment 1918 can be a hot air oven that can expedite curing, post-curing, etc.

As an example, a copper conductor can be coated with a relatively thin layer of a lead (Pb) alloy and a co-extrusion process can co-extrude a tie layer and insulation about the coated copper conductor. In such an example, a lead (Pb) alloy tape may be wrapped about the insulation, for example, directly or indirectly where another layer may optionally exist about the insulation (e.g., another tie layer, etc.).

As an example, a manufacturing process can include extruding polymeric material and heating the material to about 200 degrees C. or more (e.g., about 392 degrees F. or more) for about several minutes for polymerization, curing, vulcanizing, etc. As an example, a curing temperature may be about 200 degrees C. to about 205 degrees C. (e.g., about 392 degrees F. to about 401 degrees F.).

As an example, heat loss or cooling may occur for extruded material or materials. For example, extruded material may cool approximately to an ambient temperature (e.g., a room temperature of about 5 degrees C. to about 40 degrees C.).

As an example, a process can include post-curing, for example, after passing extruded material through a heater.

As an example, a polymerization process may be characterized at least in part by a curve such as, for example, a vulcanization curve, which can exhibit an increase in viscosity of polymeric material (e.g., insulation) during cross-linking. As an example, a steepness of a curve can be affected by the nature of one or more additives (e.g., accelerator(s), etc.). As an example, a process may control polymerization, extrusion, etc. (e.g., at a particular point in time along a viscosity curve, modulus curve, polymerization curve, etc.). As an example, a curve may correspond to one or more material states of a material (e.g., molten, crystallized, polymerized, etc.).

As an example, processing equipment can include inspection equipment that can inspect layers, etc. at one or more points. For example, inspection equipment may inspect an extruded polymeric insulation layer at point a distance from a die of an extruder and/or inspect an extruded polymeric shield layer at a point a distance from a die of an extruder.

As an example, a single extruder may be utilized, for example, with a single material or with two materials. As an example, the single material or one of the materials can be an insulation that electrically insulates a conductor. Where two materials are extruded via a single extruder, one of the materials can be a shield material that acts to shield insulation material. As an example, a shield material may be a wrappable material (e.g., tape, etc.).

As an example, a polymeric material can be an ethylene propylene diene monomer (M-class) rubber (EPDM). EPDM rubber is a terpolymer of ethylene, propylene, and a diene-component. As an example, ethylene content may be, for example, from about 40 percent to about 90 percent where, within such a range, a higher ethylene content may be beneficial for extrusion.

Figure 20:
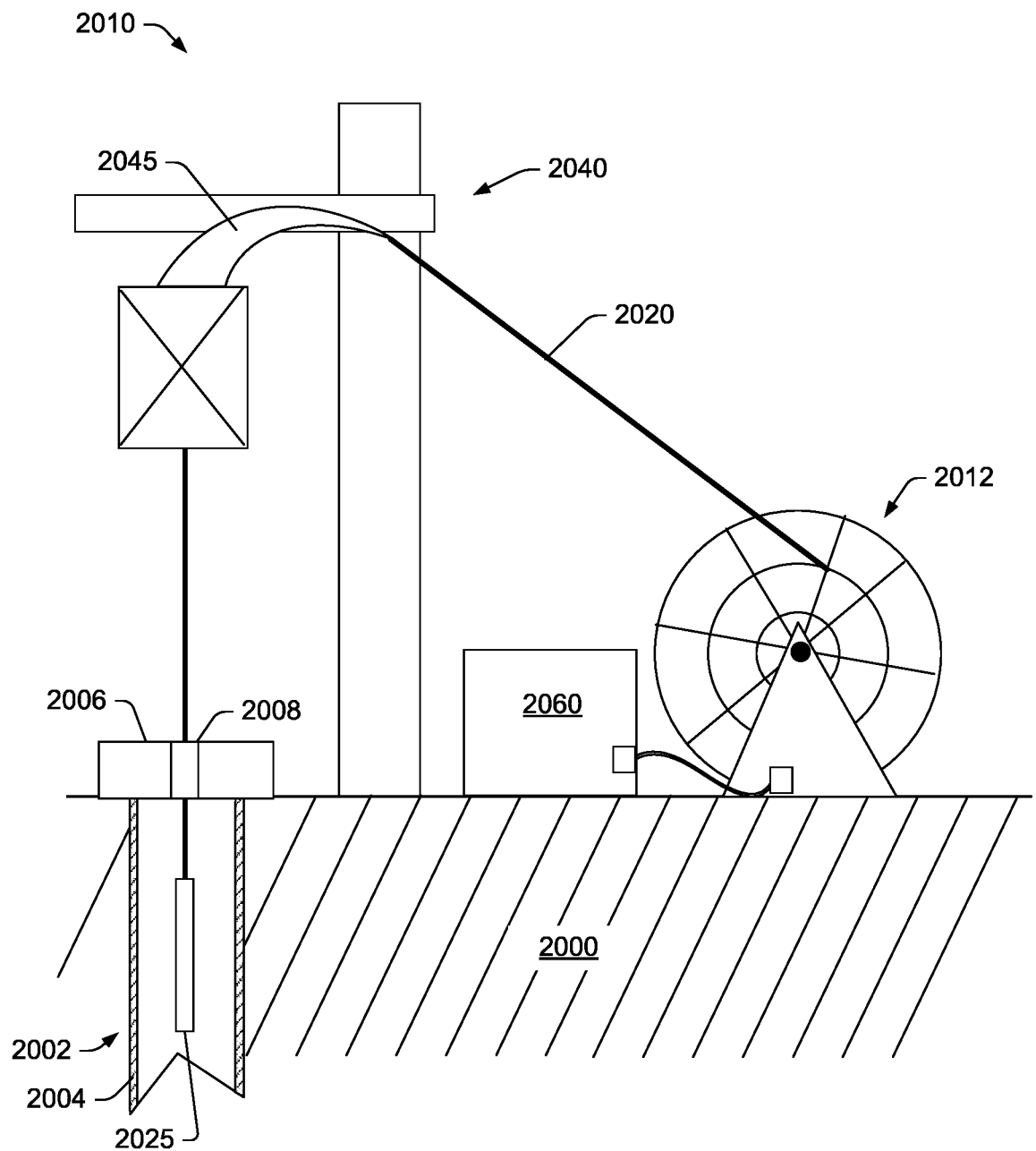
FIG. 20 illustrates an example of a system.

FIG. 20 shows an example of a geologic environment 2000 and a system 2010 positioned with respect to the geologic environment 2000. As shown, the geologic environment 2000 may include at least one bore 2002, which may include casing 2004 and well head equipment 2006, which may include a sealable fitting 2008 that may form a seal about a cable 2020. In the example of FIG. 20, the system 2010 may include a reel 2012 for deploying equipment 2025 via the cable 2020. As an example, the equipment 2025 may be a pump such as an ESP. As an example, the system 2010 may include a structure 2040 that may carry a mechanism such as a gooseneck 2045 that may function to transition the cable 2020 from the reel 2012 to a downward direction for positioning in the bore 2002.

As an example, the cable 2020 may include one or more conductive wires, for example, to carry power, signals, etc. For example, one or more wires may operatively couple to the equipment 2025 for purposes of powering the equipment 2025 and optionally one or more sensors. As shown in the example of FIG. 20, a unit 2060 may include circuitry that may be electrically coupled to the equipment 2025. As an example, the cable 2020 may include or carry one or more wires and/or other communication equipment (e.g., fiber optics, rely circuitry, wireless circuitry, etc.) that may be operatively coupled to the equipment 2025. As an example, the unit 2060 may process information transmitted by one or more sensors, for example, as operatively coupled to or as part of the equipment 2025. As an example, the unit 2060 may include one or more controllers for controlling, for example, operation of one or more components of the system 2010 (e.g., the reel 2012, etc.). As an example, the unit 2060 may include circuitry to control depth/distance of deployment of the equipment 2025.

In the example of FIG. 20, the weight of the equipment 2025 may be supported by the cable 2020. As an example, the cable 2020 may support the weight of the equipment 2025 and its own weight, for example, to deploy, position, retrieve the equipment 2025.

As an example, the cable 2020 may have a relatively smooth outer surface, which may be a polymeric surface. In such an example, the surface may facilitate deployment and/or sealability, for example, to form a seal about the cable 2020 (e.g., at a wellhead and/or at one or more other locations).

A method can include extruding an electrically insulating elastomeric compound about a conductor where the electrically insulating elastomeric compound includes ethylene propylene diene monomer (M-class) rubber (EPDM) and an alkane-based peroxide that generates radicals that form decomposition products; cross-linking the EPDM via radical polymerization to form an electrically insulating layer about the conductor; heating the cross-linked EPDM to at least 55 degrees C. to reduce the concentration of the decomposition products in the electrically insulating layer; and disposing a gas barrier layer about the electrically insulating layer. In such an example, the alkane-based peroxide can be 2,5-dimethyl-2,5-di(t-butylperoxy)hexane or can be 2,5-dimethyl-2,5-di(tert-butylperoxy)hexyne-3. As an example, both of the aforementioned alkane-based peroxides can be included in the compound.

As an example, a gas barrier layer can be a ground plane. As an example, a gas barrier layer can include lead (Pb) (e.g., as metal and/or as alloy).

As an example, decomposition products can include peroxide decomposition products where the largest of the peroxide decomposition products is acetone.

As an example, an electrically insulating elastomeric compound can include an EPDM plasticizer that includes unsaturated diene at greater than approximate 5 percent by weight. In such an example, cross-linking can cross-link at least a portion of the EPDM plasticizer to EPDM that serves as a base polymer of a compound. As an example, EPDM plasticizer can be of an average molecular weight that is less than the average molecular weight of the EPDM that serves as a base polymer of a compound. As an example, an EPDM plasticizer can include an amount by weight of unsaturated diene groups that exceeds an amount by weight of unsaturated diene groups of EPDM that serves as a base polymer of a compound.

As an example, a submersible power cable can include a conductor; an insulation layer disposed about the conductor where the insulation layer includes ethylene propylene diene monomer (M-class) rubber (EPDM) and where the insulation layer includes less than 3 percent by weight of hexane extractable peroxide decomposition products; and a gas barrier layer disposed about the insulation layer. In such an example, the gas barrier layer can include lead (Pb). As an example, such a submersible power cable can include a plurality of insulated conductors where the gas barrier layer includes lead (Pb) and where the gas barrier layer is a ground plane.

As an example, a submersible power cable can include a largest of peroxide decomposition products that is acetone.

As an example, in a submersible power cable, peroxide decomposition products can consist of peroxide decomposition products of an alkane-based peroxide. In such an example, the peroxide decomposition products can consist of non-aromatic decomposition products. As an example, in a submersible power cable, an insulation layer can include less than about 2 percent by weight of hexane extractable peroxide decomposition products.

As an example, a submersible power cable can be temperature rated to a temperature greater than 250 degrees C. For example, where such a cable includes an insulation layer that includes less than 3 percent by weight of hexane extractable peroxide decomposition products, risk of rupture of a gas barrier layer can be reduced at a particular temperature; noting that at some elevated temperature above the rated temperature, various constituents of insulation will degrade and can result in pressure being applied to a gas barrier layer.

An electric submersible pump power cable can include a conductor; an insulation layer disposed about the conductor where the insulation layer includes ethylene propylene diene monomer (M-class) rubber (EPDM) and where the insulation layer includes less than 3 percent by weight of hexane extractable peroxide decomposition products; a gas barrier layer disposed about the insulation layer; and an armor layer disposed about the gas barrier layer. In such an example, the ESP power cable may be rated to a temperature greater than about 250 degrees C.

As an example, a power cable can include a conductor; a cured EPDM-based insulation layer on the conductor; and a lead (Pb) based jacket on the EPDM-based insulation layer. Such an EPDM-based insulation layer can include vinyl silane treated kaolin clay filler material, can include a metal oxide, can include an antioxidant, can include EPDM-based insulation that is a cured EPDM-based insulation where the EPDM-based insulation was cured using DBPH. A cable can include an armor layer surrounding a lead (Pb) based layer that serves as a gas barrier layer (e.g., or gas barrier jacket). As an example, a power cable can have a temperature rating above about 240 degrees C. For example, consider greater than about 250 degrees C.

As an example, one or more methods described herein may include associated computer-readable storage media (CRM) blocks. Such blocks can include instructions suitable for execution by one or more processors (or cores) to instruct a computing device or system to perform one or more actions.

According to an embodiment, one or more computer-readable media may include computer-executable instructions to instruct a computing system to output information for controlling a process. For example, such instructions may provide for output to sensing process, an injection process, drilling process, an extraction process, an application process, an extrusion process, a curing process, a tape forming process, a pumping process, a heating process, etc.

Figure 21:
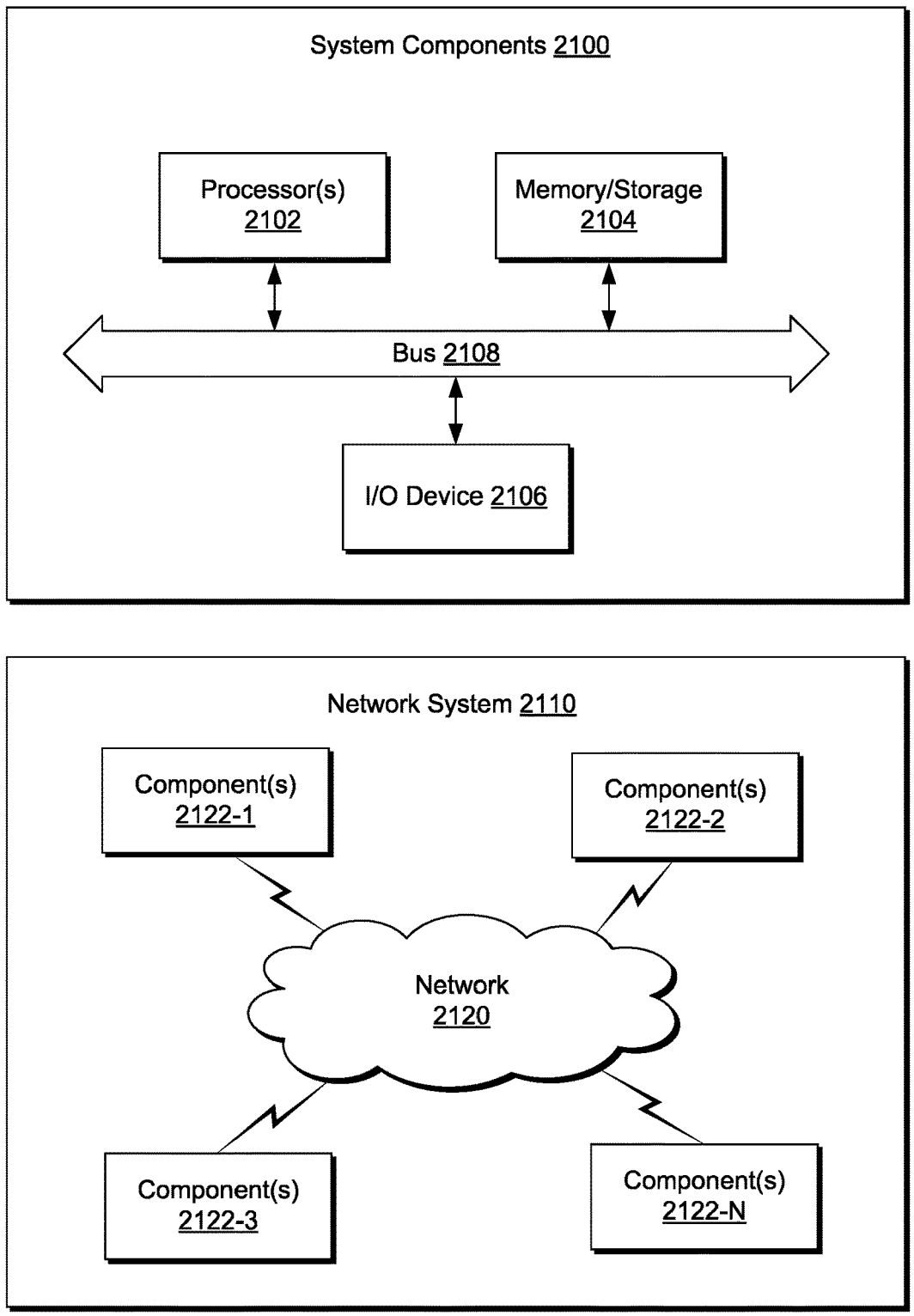
FIG. 21 illustrates example components of a system and a networked system.

FIG. 21 shows components of a computing system 2100 and a networked system 2110. The system 2100 includes one or more processors 2102, memory and/or storage components 2104, one or more input and/or output devices 2106 and a bus 2108. According to an embodiment, instructions may be stored in one or more computer-readable media (e.g., memory/storage components 2104). Such instructions may be read by one or more processors (e.g., the processor(s) 2102) via a communication bus (e.g., the bus 2108), which may be wired or wireless. The one or more processors may execute such instructions to implement (wholly or in part) one or more attributes (e.g., as part of a method). A user may view output from and interact with a process via an I/O device (e.g., the device 2106). According to an embodiment, a computer-readable medium may be a storage component such as a physical memory storage device, for example, a chip, a chip on a package, a memory card, etc.

According to an embodiment, components may be distributed, such as in the network system 2110. The network system 2110 includes components 2122-1, 2122-2, 2122-3, . . . 2122-N. For example, the components 2122-1 may include the processor(s) 2102 while the component(s) 2122-3 may include memory accessible by the processor(s) 2102. Further, the component(s) 2122-2 may include an I/O device for display and optionally interaction with a method. The network may be or include the Internet, an intranet, a cellular network, a satellite network, etc.

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A submersible power cable comprising:
   a conductor;
   an insulation layer disposed about the conductor wherein the insulation layer comprises ethylene propylene diene monomer (M-class) rubber (EPDM) wherein the insulation layer comprises less than 3 percent by weight of hexane extractable peroxide decomposition products; and
   a gas barrier layer disposed about the insulation layer.

2. The submersible power cable of claim 1 wherein the gas barrier layer comprises lead (Pb).

3. The submersible power cable of claim 1 comprising a plurality of insulated conductors wherein the gas barrier layer comprises lead (Pb) and is a ground plane.

4. The submersible power cable of claim 1 wherein the largest of the peroxide decomposition products comprises acetone.

5. The submersible power cable of claim 1 wherein the peroxide decomposition products consist of peroxide decomposition products of an alkane-based peroxide.

6. The submersible power cable of claim 1 wherein the peroxide decomposition products consist of non-aromatic decomposition products.

7. The submersible power cable of claim 1 wherein the insulation layer comprises less than 2 percent by weight of hexane extractable peroxide decomposition products.

8. The submersible power cable of claim 1 comprising a temperature rating greater than 250 degrees C.

9. The submersible power cable of claim 1, the insulation layer comprising 2,5-dimethyl-2,5-di(t-butylperoxy)hexane that generates radicals that form the decomposition products.

10. An electric submersible pump power cable comprising:
    a conductor;
    an insulation layer disposed about the conductor wherein the insulation layer comprises ethylene propylene diene monomer (M-class) rubber (EPDM) wherein the insulation layer comprises less than 3 percent by weight of hexane extractable peroxide decomposition products;
    a gas barrier layer disposed about the insulation layer; and
    an armor layer disposed about the gas barrier layer.

11. The electric submersible power cable of claim 10 comprising a temperature rating greater than 250 degrees C.

12. The electric submersible power cable of claim 10, the insulation layer comprising 2,5-dimethyl-2,5-di(t-butylperoxy)hexane that generates radicals that form the decomposition products.

13. A submersible power cable comprising:
    a conductor;
    an insulation layer disposed about the conductor, wherein the insulation layer comprises ethylene propylene diene monomer (M-class) rubber (EPDM) and an alkane-based peroxide that generates radicals that form decomposition products, wherein the decomposition products comprise peroxide decomposition products and wherein the largest of the peroxide decomposition products comprises acetone; and
    a gas barrier layer disposed about the insulation layer.

14. The submersible power cable of claim 13, wherein the insulation layer further comprises an antioxidant package comprising 0.5-3 phr of each of a primary antioxidant and a secondary antioxidant.

15. The submersible power cable of claim 13, wherein the EPDM is cross-linked via radical polymerization.

16. The submersible power cable of claim 15, wherein the cross-linked EPDM is heated to greater than 80 degrees C. for less than one day to reduce the concentration of the decomposition products in the insulation layer.

17. The submersible power cable of claim 13, the gas barrier layer comprising lead (Pb).

18. The submersible power cable of claim 13, wherein the submersible power cable has a temperature rating greater than 250 degrees C.

19. The submersible power cable of claim 13, wherein the alkane-based peroxide is 2,5-dimethyl-2,5-di(t-butylperoxy) hexane.

20. The submersible power cable of claim 13, wherein the insulation layer has a dielectric constant between 2.0 and 3.0 when aged over time in an oxygen depleted environment.

* * * * *